(12) United States Patent
   Jun

(10) Patent No.: US 12,411,335 B2
(45) Date of Patent: Sep. 9, 2025

(54) CAMERA MODULE

(71) Applicant: LG INNOTEK CO., LTD., Seoul (KR)

(72) Inventor: Jae Hoon Jun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 580 days.

(21) Appl. No.: 17/756,710

(22) PCT Filed: Nov. 27, 2020

(86) PCT No.: PCT/KR2020/017105
§ 371 (c)(1),
(2) Date: May 31, 2022

(87) PCT Pub. No.: WO2021/107693
PCT Pub. Date: Jun. 3, 2021

(65) Prior Publication Data
US 2023/0185076 A1    Jun. 15, 2023

(30) Foreign Application Priority Data

Nov. 28, 2019   (KR) .................. 10-2019-0155782

(51) Int. Cl.
G02B 26/00    (2006.01)
G02B 3/12     (2006.01)
(Continued)

(52) U.S. Cl.
CPC ............. *G02B 26/004* (2013.01); *G02B 3/12* (2013.01); *G02B 7/36* (2013.01); *G02B 26/0875* (2013.01); *G02B 27/646* (2013.01); *G03B 13/36* (2013.01); *H04N 23/52* (2023.01); *H04N 23/67* (2023.01); *H04N 23/6812* (2023.01); *H04N 23/687* (2023.01); *G02B 7/021* (2013.01)

(58) Field of Classification Search
CPC .................................................... G02B 26/004
See application file for complete search history.

(56) References Cited

U.S. PATENT DOCUMENTS 11,506,824 B2 * 11/2022 Moon ................. G02B 26/005
2020/0096679 A1 *  3/2020 Kaminski ........... G02B 26/004

FOREIGN PATENT DOCUMENTS

JP      2011-521277 A    7/2011
KR   10-2018-0086737 A   8/2018
(Continued)

OTHER PUBLICATIONS

International Search Report dated Feb. 26, 2021 in International Application No. PCT/KR2020/017105.

*Primary Examiner* — Edmond C Lau
(74) *Attorney, Agent, or Firm* — Saliwanchik, Lloyd & Eisenschenk

(57) ABSTRACT

Disclosed is a camera module comprising: a lens assembly comprising a liquid lens which comprises a first liquid and a second liquid forming the surface; a gyro sensor for outputting inclination information; and a controller for adjusting the surface by applying a driving signal to the liquid lens on the basis of focal information and the inclination information, wherein the controller applies different weights to the driving signal in accordance with the angular velocity of the liquid lens obtained on the basis of the inclination information.

13 Claims, 26 Drawing Sheets

(51) Int. Cl.
*G02B 7/36* (2021.01)
*G02B 26/08* (2006.01)
*G02B 27/64* (2006.01)
*G03B 13/36* (2021.01)
*H04N 23/52* (2023.01)
*H04N 23/67* (2023.01)
*H04N 23/68* (2023.01)
*G02B 7/02* (2021.01)

(56) References Cited

FOREIGN PATENT DOCUMENTS

| KR | 10-2019-0089491 A | 7/2019 |
| KR | 10-2019-0131578 A | 11/2019 |
| WO | 2018/194195 A1 | 10/2018 |

\* cited by examiner

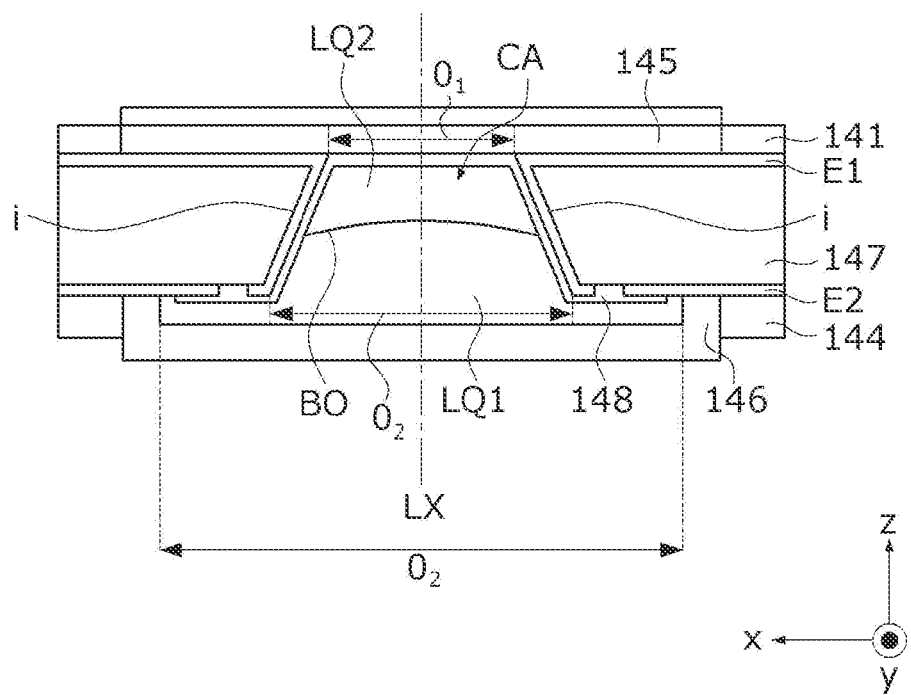

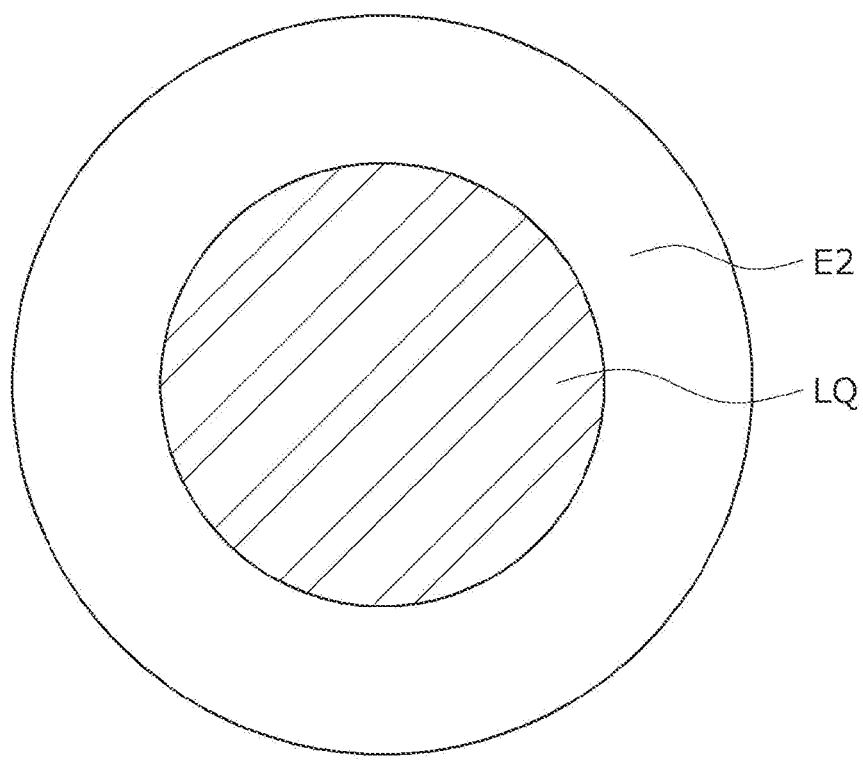

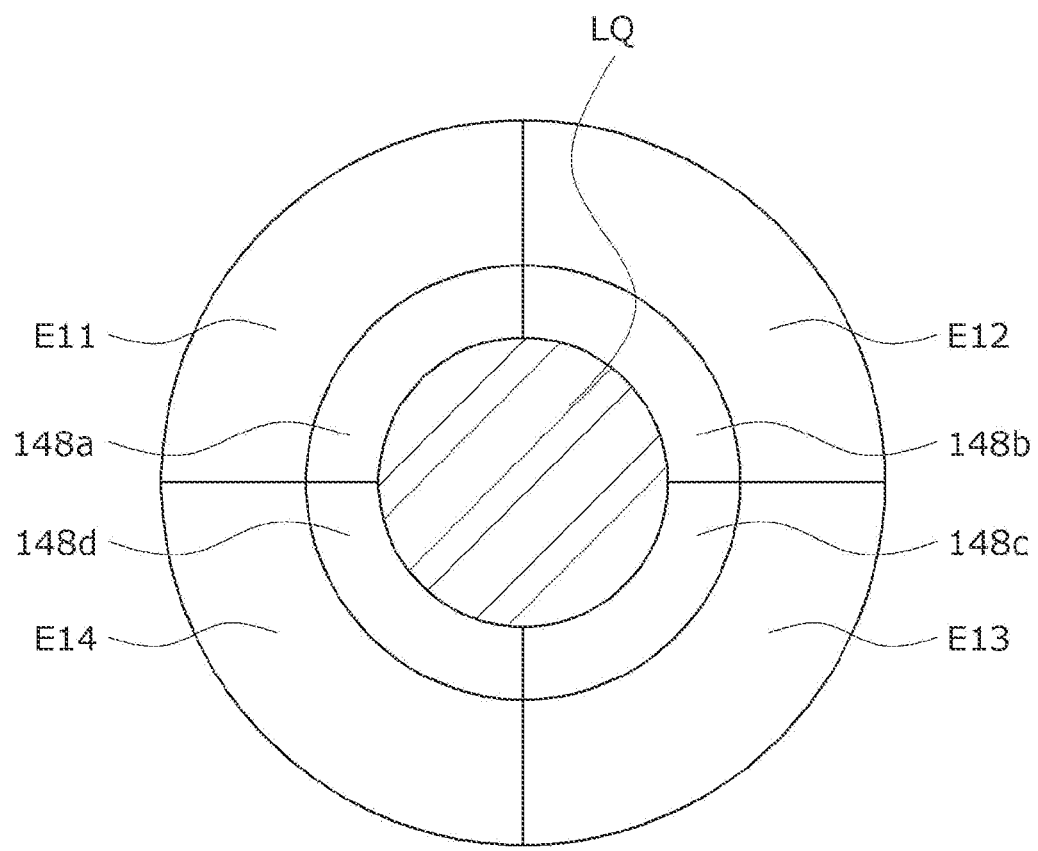

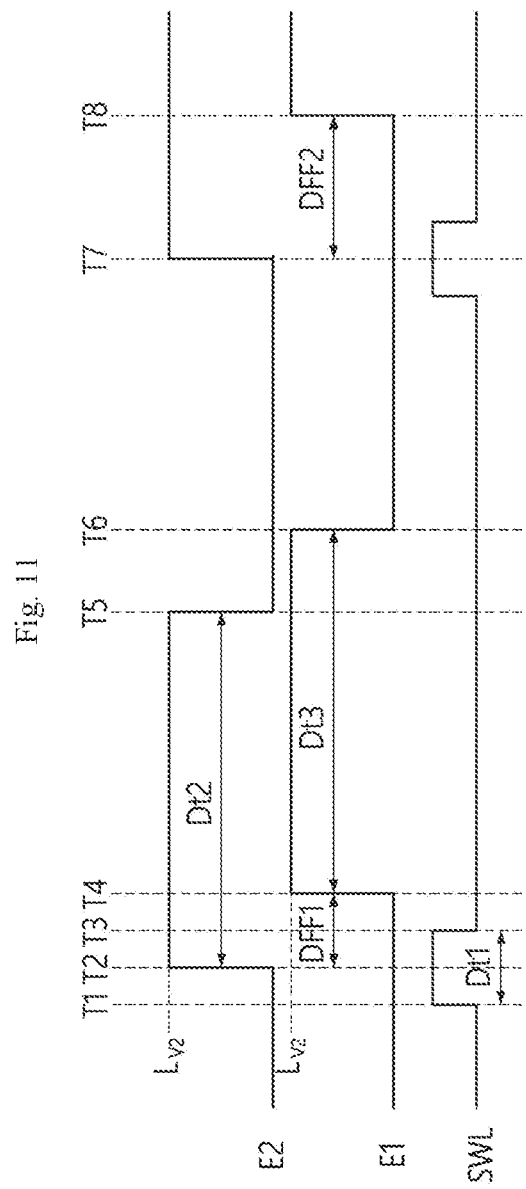

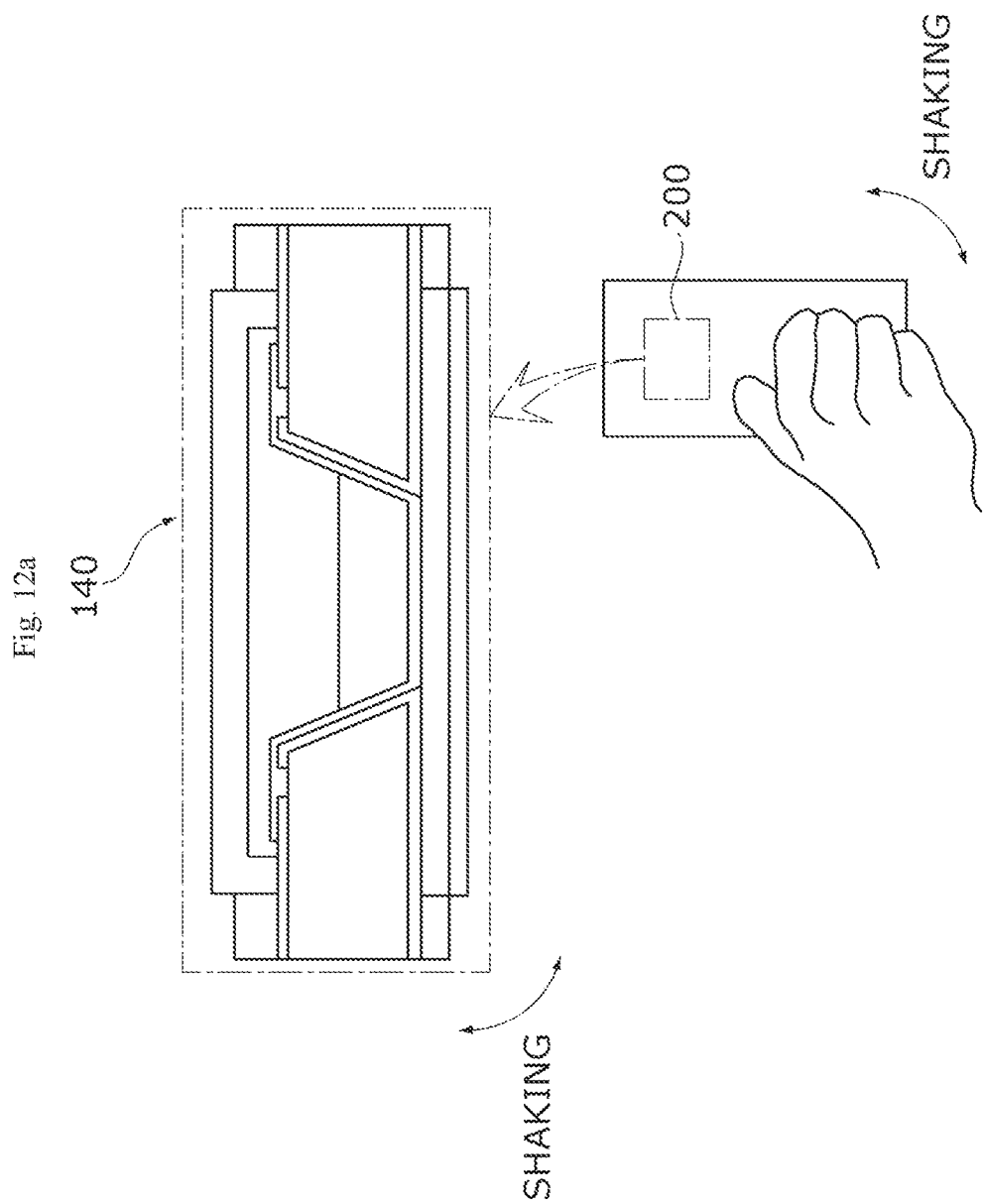

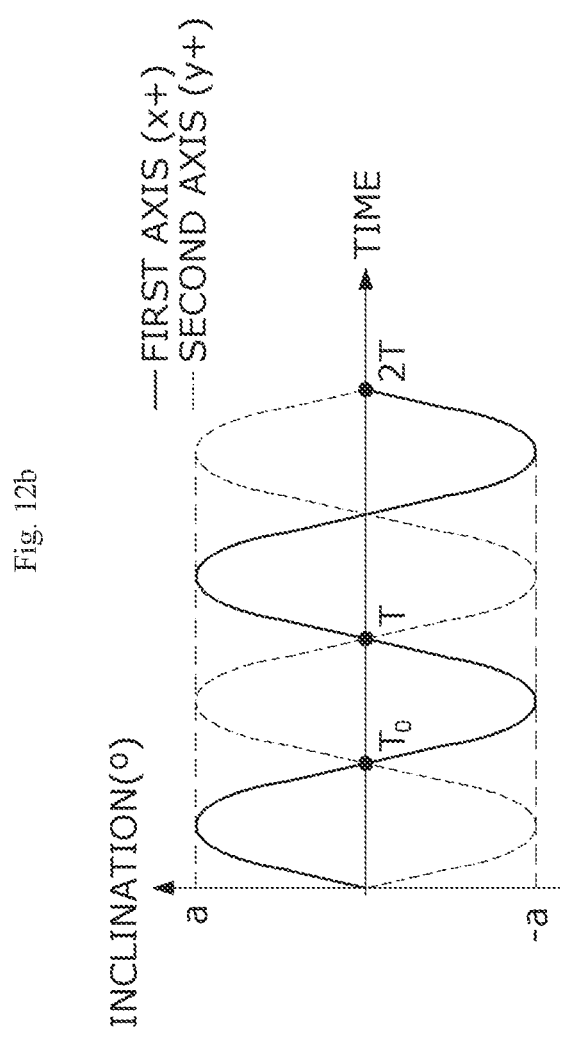

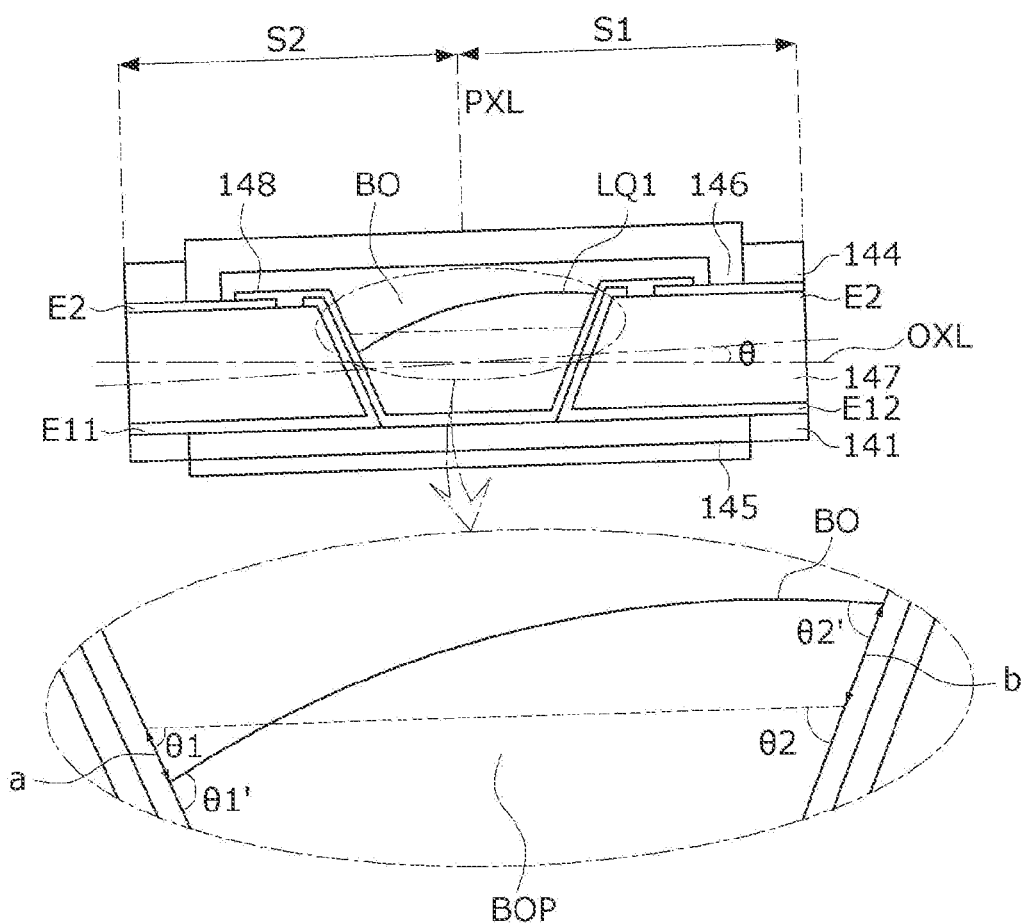

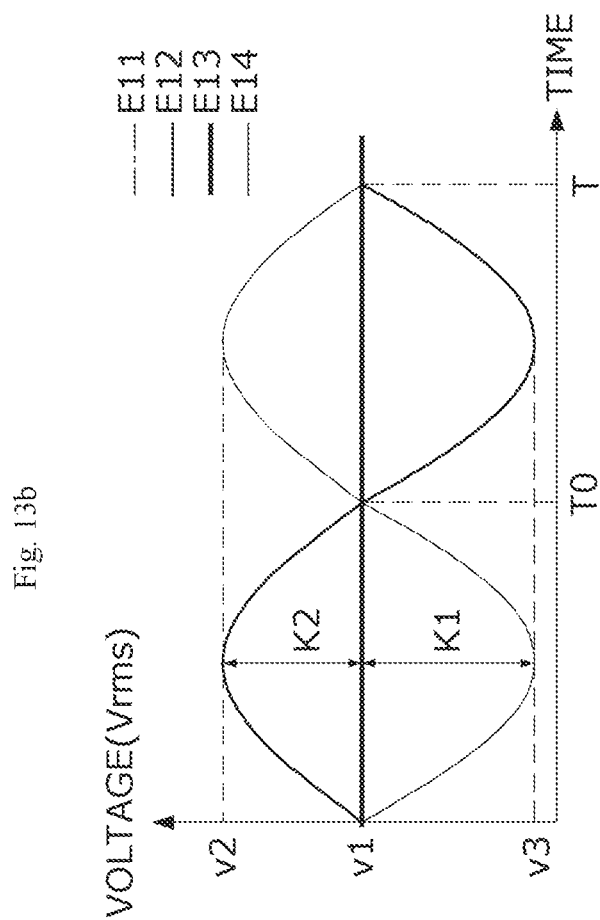

CAMERA MODULE

CROSS-REFERENCE TO RELATED APPLICATIONS

This application is the U.S. national stage application of International Patent Application No. PCT/KR2020/017105, filed Nov. 27, 2020, which claims the benefit under 35 U.S.C. § 119 of Korean Application No. 10-2019-0155782, filed Nov. 28, 2019, the disclosures of each of which are incorporated herein by reference in their entirety.

TECHNICAL FIELD

An embodiment relates to a camera module.

BACKGROUND ART

Users of portable devices demand optical devices that have high resolution, are small in size, and have various photographing functions. For example, the various photographing functions may include at least one of an optical zoom-in/zoom-out function, an auto-focusing (AF) function, and a hand-tremor compensation or optical image stabilizer (OIS) function.

Conventionally, in order to realize the above-described various photographing functions, a method of combining a plurality of lenses and directly moving the combined lenses is used. However, in the case in which the number of lenses is increased as described above, the size of the optical device may be increased.

The auto-focusing function and the hand-tremor compensation function are performed by moving or tilting several lenses, which are fixed to a lens holder and are aligned with an optical axis, along the optical axis or in a direction perpendicular to the optical axis, and to this end, a separate lens driving device is required to drive a lens assembly composed of a plurality of lenses. However, the lens driving device has high power consumption, and in order to protect the lens driving device, there is a problem in that the overall size of the conventional camera module is increased because a cover glass needs to be separately added to the camera module. In order to solve this problem, research has been conducted on a liquid lens unit, which performs the auto-focusing function and the hand-tremor compensation function by electrically adjusting a curvature of an interface of two types of liquids.

However, the interface of the liquid lens is variously deformed according to the temperature, and thus improvements in accuracy are required.

DISCLOSURE

Technical Problem

An embodiment is directed to providing a camera module that includes a lens capable of adjusting a position of an interface positioned between two liquids according to electrical energy and is capable of compensating for a change of a diopter caused by deformation of the interface generated according to a temperature of a structure in which the two liquids included in the lens may be housed.

An embodiment is also directed to providing a camera module capable of adjusting a temperature to correspond to a change in a spatial frequency response (SFR) according to a temperature change of a liquid lens, and adjusting a driving voltage that may adjust the movement of an interface of liquids according to the temperature in order to overcome the characteristics and tendency of the liquid lens, in which a degree of curvature and bias of the interface formed by the two liquids included in the lens are adjusted according to a supply voltage and the resolution of the lens is lowered due to a thermal expansion coefficient according to the temperature change.

Objectives to be solved by the embodiment are not limited to the above-described objective and will include objectives or effects which may be identified by solutions for the objectives or the embodiments described below.

Technical Solution

A camera module according to an embodiment includes a lens assembly including a liquid lens having a first liquid and a second liquid that form an interface, a gyro sensor configured to output inclination information, and a controller configured to adjust the interface by applying a driving signal to the liquid lens on the basis of focus information and the inclination information, wherein the controller applies different weights to the driving signal according to an angular velocity of the liquid lens obtained on the basis of the inclination information. The controller may apply a first weight to the driving signal when the angular velocity of the liquid lens increases, and apply a second weight to the driving signal when the angular velocity of the liquid lens decreases, wherein the first weight may be greater than the second weight.

The controller may vary a time difference between a plurality of pulses applied to the liquid lens according to the first weight and the second weight.

The time difference may include a first delay corresponding to the first weight and a second delay corresponding to the second weight, wherein the first delay may be greater than the second delay.

A ratio of the second weight and the first weight may be in a range of 1:1.1 to 1:1.5.

The controller may compensate for a difference between the first weight and the second weight in response to a half cycle of the driving signal.

The controller may increase an average voltage difference of the driving signal for each cycle during compensation.

The controller may be driven according to Equation 1 below, $$\begin{bmatrix} V_x^+ \\ V_x^- \\ V_y^+ \\ V_y^- \end{bmatrix} = V_0 \cdot \begin{bmatrix} 1 \\ 1 \\ 1 \\ 1 \end{bmatrix} + \begin{bmatrix} +G_{tilt}^*(g1 \text{ or } g2) & 0 & \varepsilon \\ -G_{tilt}^*(g1 \text{ or } g2) & 0 & \varepsilon \\ 0 & +G_{tilt}^*(g1 \text{ or } g2) & \varepsilon \\ 0 & -G_{tilt}^*(g1 \text{ or } g2) & \varepsilon \end{bmatrix} \quad \text{Equation 1}$$

$$\begin{bmatrix} \theta_x \\ \theta_y \\ \max_{절댓값}[(|\theta_x - \theta_y| + |\theta_x + \theta_y|) - (|\theta_x - \theta_y| + |\theta_x + \theta_y|)] \end{bmatrix}$$

(where $V_X^+$, $V_X^-$, $V_Y^+$, and $V_Y^-$ are each a voltage of the driving signal applied to each individual electrode, $V_O$ is a voltage applied to the individual electrode to set a focus according to auto-focusing (AF) or a voltage before the compensation for shaking, Gtilt is a linear correlation coefficient between an optical inclination of the liquid lens and a voltage offset between opposite electrodes (e.g., $X^+$ and $X^-$ or $Y^+$ and $Y^-$), g1 is the second weight, g2 is the first weight, and F is a focus compensation parameter according to the first and second weights in the controller. In addition, $\theta_x$ is an x-axis angle, and $\theta_y$ is a y-axis angle.)

The camera module may further include a sensor unit configured to detect interface information corresponding to a curvature of the interface.

The sensor unit may detect a capacitance corresponding to a size or a change in an area of the interface.

The camera module may further include an image sensor configured to receive light passing through the lens assembly, and the focus information may be based on image information output from the image sensor.

The controller may change the weights equally after a predetermined time.

The liquid lens may include a plate including a cavity in which a conductive liquid and a non-conductive liquid are disposed while forming an interface, a plurality of individual terminals disposed below the plate, and a common terminal disposed above the plate.

The driving signal may be applied to the plurality of individual terminals.

The driving signal may include a signal applied to at least one of the plurality of individual terminals and the common electrode for a predetermined cycle.

Advantageous Effects

An embodiment provides a camera module capable of inhibiting a decrease in resolution or accuracy caused by a change in an interface of a liquid lens according to a temperature.

Various advantages and effects of the present invention are not limited to the above description and can be more easily understood through the description of specific exemplary embodiments of the present invention.

DESCRIPTION OF DRAWINGS

FIG. 4 is a cross-sectional view of a liquid lens unit according to the embodiment.

FIGS. 7A to 7C are views illustrating a structure of the liquid lens unit.

FIG. 11 is a view referenced in the description of FIGS. 9 and 10.

FIGS. 12A and 12B are views for describing a driving of the camera module in response to shaking.

FIGS. 13A and 13B are views for describing a case in which different driving signals are applied according to weights.

MODES OF THE INVENTION

Figure 1:
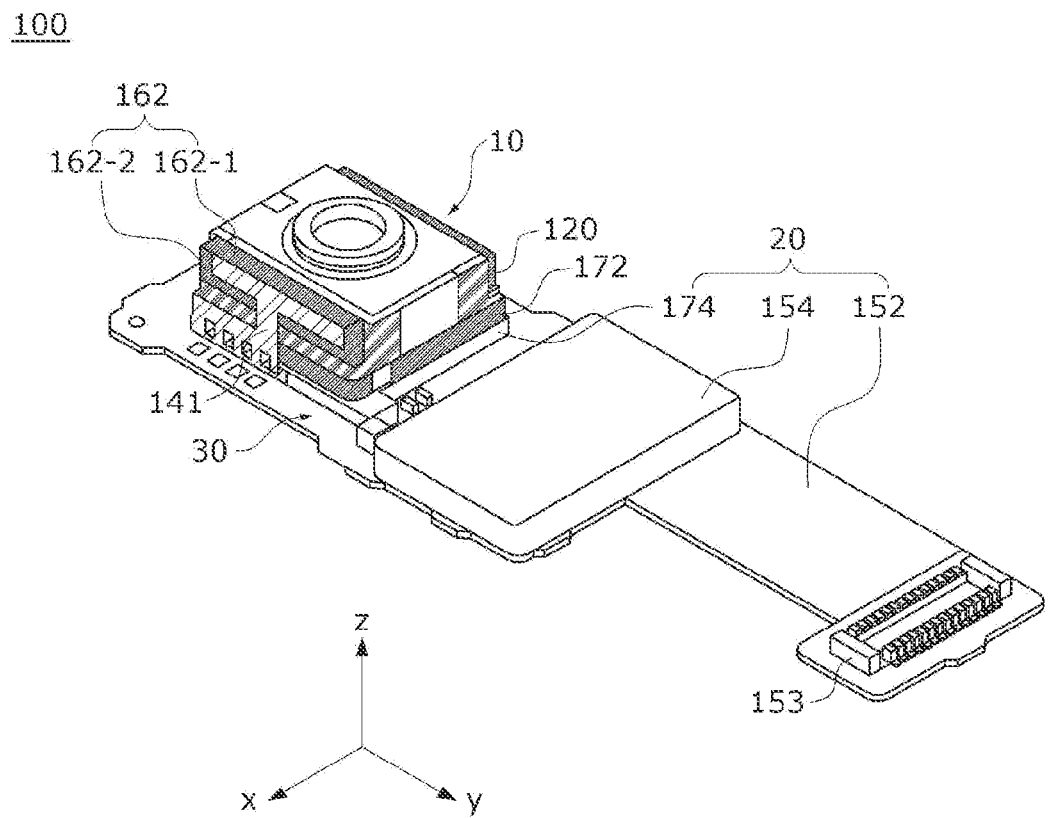
FIG. 1 is a schematic perspective view of a camera module according to an embodiment.

Hereinafter, exemplary embodiments of the present invention will be described in detail with reference to the accompanying drawings.

However, the technical spirit of the present invention is not limited to some embodiments to be disclosed below but may be realized in many different forms, and one or more components of each of the embodiments may be selectively combined and substituted within the scope of the present invention.

In addition, unless clearly and expressly defined herein, the terms (including technical and scientific terms) used in the embodiments of the present invention have the same meaning as commonly understood by one of ordinary skill in the art. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In the present specification, the singular forms include the plural forms unless the context clearly indicates otherwise, and the phrase "at least one element (or one or more elements) of an element A, an element B, and an element C," should be understood as including the meaning of at least one of all possible combinations of the element A, the element B, and the element C.

Further, in describing components of the embodiments of the present invention, the terms such as first, second, A, B, (a), (b), and the like may be used.

These terms are merely for distinguishing one component from another component, and the property, order, sequence, and the like of the corresponding components are not limited by the terms.

In addition, it will be understood that when one component is referred to as being "connected" or "coupled" to another component, the component may not only be directly connected or coupled to another component but may also be connected or coupled to another component with still another component presented between one component and another component.

Further, when one component is referred to as being formed or disposed "on (above)" or "under (below)" another component, the terms "on (above)" or "under (below)" includes both of a case in which the two components are in direct contact with each other or a case in which one or more components are (indirectly) formed or disposed between the two components. In addition, the term "on (above)" or "under (below)" includes a case in which another component is disposed in an upward direction or a downward direction with respect to one component.

The term "auto-focusing function" used below is defined as a function of automatically focusing on an object by moving a lens in an optical-axis direction to adjust a distance to an image sensor according to a distance to the object, in order to allow the image sensor to acquire a clear image of the object. Meanwhile, the "auto-focusing" may correspond to "auto focus (AF)."

The term "hand-tremor compensation function" used below is defined as a function of moving a lens and/or an image sensor to offset vibrations (movement) generated in the image sensor by an external force. Meanwhile, the "hand-tremor compensation" may correspond to "optical image stabilization (OIS)."

FIG. 1 is a schematic perspective view of a camera module according to an embodiment.

Referring to FIG. 1, a camera module 100 may include a lens assembly 10, a control circuit 20, and an image sensor 30.

First, the lens assembly 10 may include a plurality of lens units and a holder in which the plurality of lens units are accommodated. As described below, the plurality of lens units may include a liquid lens, and may further include a first lens unit or a second lens unit. The plurality of lens units may include the first and second lens units and a liquid lens unit.

The control circuit 20 serves to supply a driving voltage (or an operating voltage) to the liquid lens unit.

The control circuit 20 and the image sensor 30, which are described above, may be disposed on a single printed circuit board (PCB), but this is merely given by way of example, and the embodiment is not limited thereto.

When the camera module 100 according to the embodiment is applied to an optical device or optical instrument, the configuration of the control circuit 20 may be designed in different ways according to specifications required in the optical device. In particular, the control circuit 20 may be implemented as a single chip to reduce the magnitude of a driving voltage applied to the lens assembly 10. Thus, the size of an optical device mounted on a portable device can be further reduced. The detailed description thereof will be given below.

Figure 2:
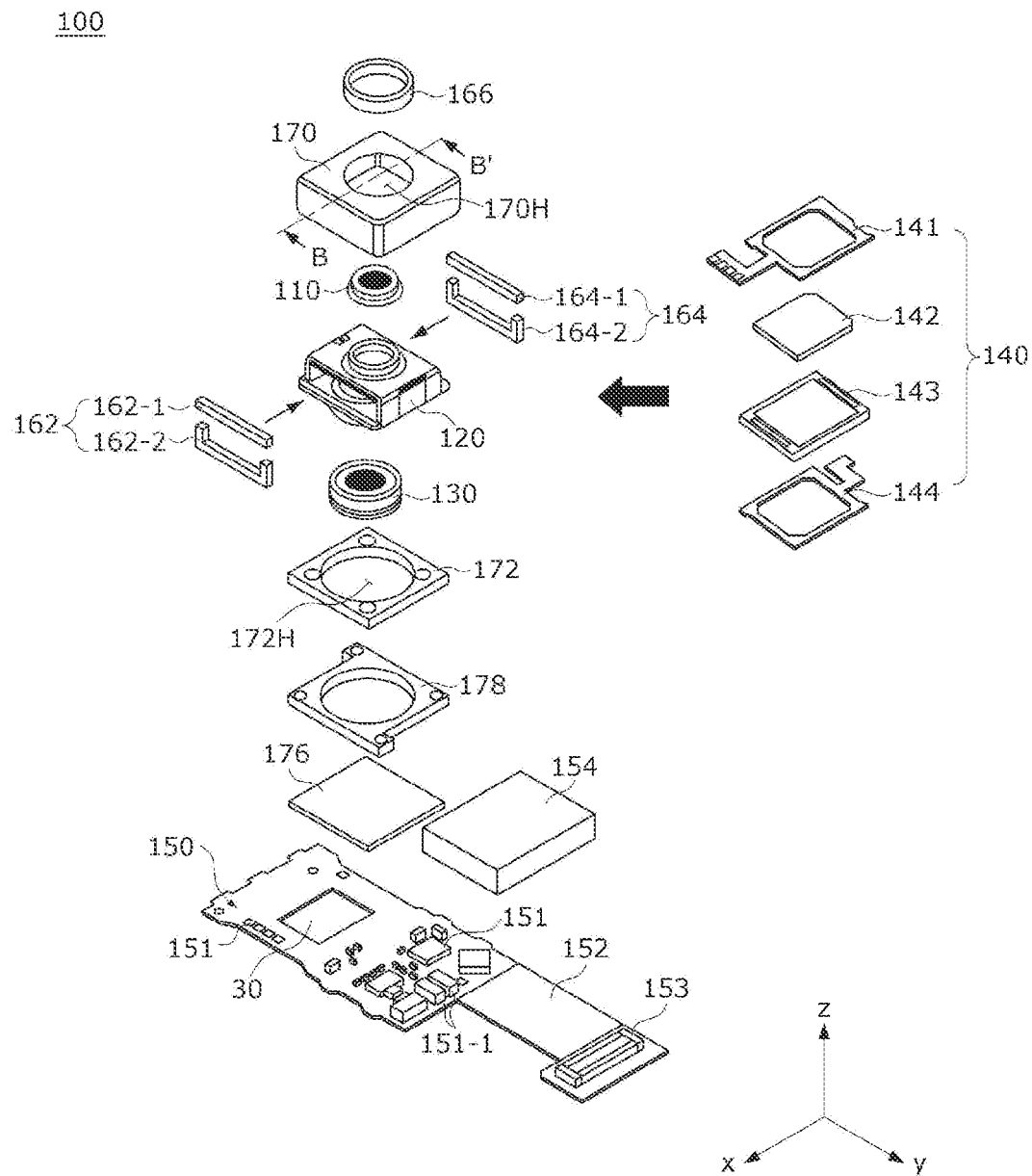
FIG. 2 is an exploded perspective view of the camera module according to the embodiment.
Figure 3:
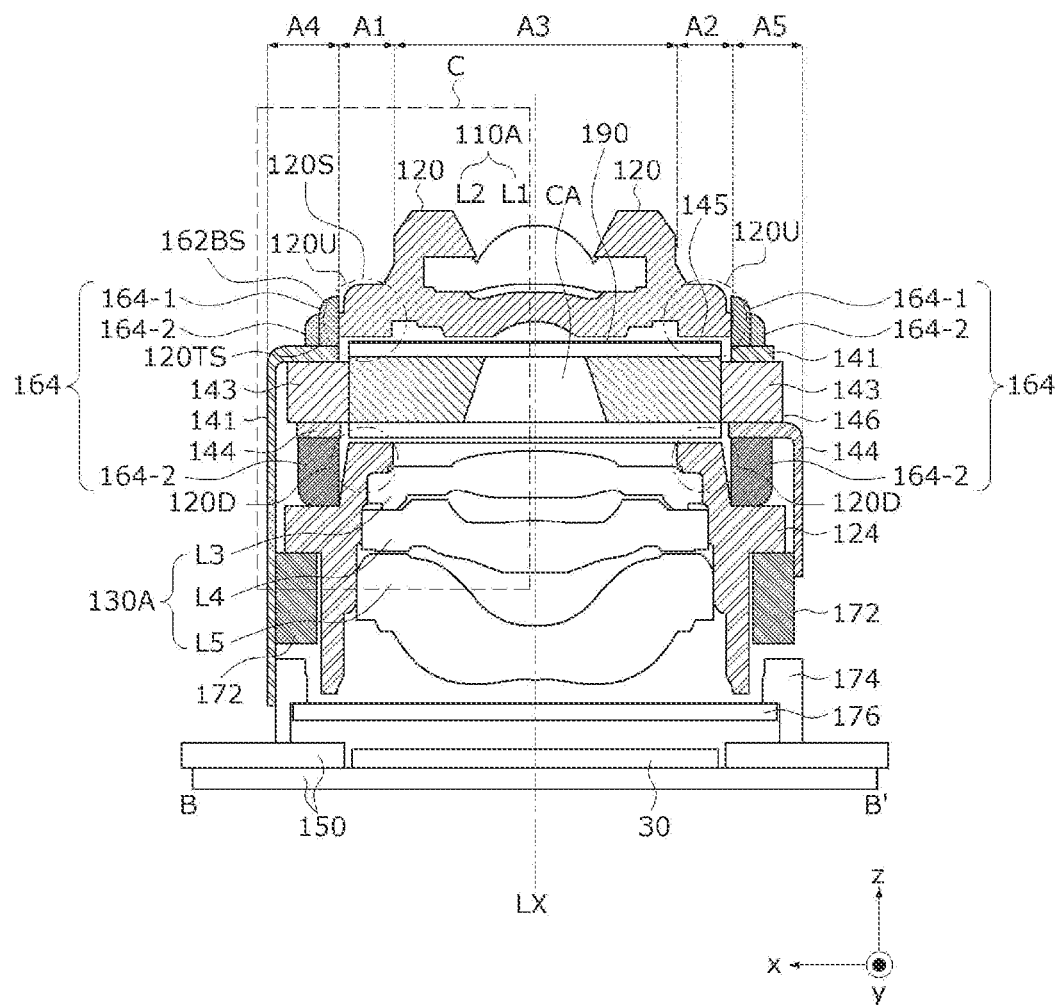
FIG. 3 is a cross-sectional view of the camera module according to the embodiment.

FIG. 2 is an exploded perspective view of the camera module according to the embodiment, FIG. 3 is a cross-sectional view of the camera module according to the embodiment, and FIG. 4 is a cross-sectional view of the liquid lens unit according to the embodiment.

Referring to FIGS. 2 and 3, the camera module 100 may include the lens assembly, a main substrate 150, and the image sensor 30. In addition, the camera module 100 may further include a first cover 170 and a middle base 172. In addition, the camera module 100 may further include one or more adhesive members 162 and 164 and a second cover 174. The one or more adhesive members serve to couple or fix a liquid lens unit 140 to a holder 120.

Here, the one or more adhesive members are exemplified as including all of a first adhesive member 162, a second adhesive member 164, and a third adhesive member 166, but the embodiment is not limited thereto. That is, according to another embodiment, the one or more adhesive members may also include only some of the first adhesive member 162, the second adhesive member 164, and the third adhesive member 166.

Further, according to the embodiment, at least one of components 110 to 190 of the camera module 100 illustrated in FIG. 2 may be omitted. Alternatively, at least one component different from the components 110 to 190 illustrated in FIG. 2 may be further added and included in the camera module 100.

For convenience of description, the third adhesive member 166, the first cover 170, the second cover 174, and an optical layer 190 illustrated in FIG. 2 are omitted in FIG. 3.

Further, the lens assembly 10 (see FIG. 1) may include at least one of the liquid lens unit 140, the holder 120, the first lens unit 110, the second lens unit 130, the first adhesive member 162, the second adhesive member 164, and the third adhesive member 166. In addition, the lens assembly may be disposed above the main substrate 150.

In addition, in order to distinguish the first and second lens units from the liquid lens unit 140 in the lens assembly, the first lens unit 110 and the second lens unit 130 may be referred to as a "first solid lens unit" and a "second solid lens unit," respectively.

The first lens unit 110 may be disposed on an upper side of the lens assembly and may be a region on which light is incident from the outside of the lens assembly. That is, the first lens unit 110 may be disposed above the liquid lens unit 140 in the holder 120. The first lens unit 110 may be implemented as a single lens and may be implemented as two or more lenses that are aligned along a central axis to form an optical system. Here, the central axis may be an optical axis LX of the optical system, which is formed by the first lens unit 110, the liquid lens unit 140, and the second lens unit 130 included in the camera module 100, and may be an axis parallel to the optical axis LX. The optical axis LX may be the same as an optical axis f of the image sensor 30.

That is, the first lens unit 110, the liquid lens unit 140, the second lens unit 130, and the image sensor 30 may be aligned and disposed along the optical axis LX through active alignment (AA). Here, the active alignment may be an operation of aligning the optical axes of the first lens unit 110, the second lens unit 130, and the liquid lens unit 140, and adjusting an axis relationship or a distance relationship between the image sensor 30 and the lens units 110, 130, and 140 in order to acquire an improved image.

In an embodiment, the active alignment may be performed by an operation of analyzing image data generated by receiving light, which is incident from a specific object, by the image sensor 30 through at least one of the first lens unit 110, the second lens unit 130, and the liquid lens unit 140. For example, the active alignment may be performed in the following sequence.

As an example, after active alignment (first alignment) that adjusts relative positions between the first and second lens units 110 and 130, which are fixed and mounted to the holder 120, and the image sensor 30 is completed, and active alignment (second alignment) that adjusts relative positions between the liquid lens unit 140, which is inserted into the holder 120, and the image sensor 30 may be performed. The first alignment may be performed while a gripper grips the middle base 172 and moves the middle base to various positions, and the second alignment may be performed while the gripper grips a spacer 143 of the liquid lens unit 140 and moves the spacer to various positions. However, the active alignment may be performed in a sequence different from the above-described sequence.

In addition, the holder 120 may include a holder upper region 120U disposed above the liquid lens unit 140 and a holder lower region 120D disposed below the liquid lens unit 140. In this case, the first and second adhesive members 162 and 164 may respectively couple the holder upper region 120U and the holder lower region 120D to the liquid lens unit 140.

In addition, when the first and second adhesive members 162 and 164 are disposed, the liquid lens unit 140 may be stably fixed and coupled to the holder 120.

Further, the first lens unit 110 may include, for example, two lenses L1 and L2, but this is exemplary, and the number of lenses included in the first lens unit 110 may be one or more.

In addition, an exposure lens may be disposed on an upper side of the first lens unit 110. Here, the exposure lens may mean an outermost lens among the lenses included in the first lens unit 110. That is, the lens L1 positioned at the uppermost side of the first lens unit 110 may protrude upward and thus perform a function of the exposure lens. A surface of the exposure lens protrudes to the outside of the holder 120 and thus may be damaged. When the surface of the exposure lens is damaged, the quality of an image captured by the camera module 100 may be degraded. Accordingly, in order to inhibit or suppress damage to the surface of the exposure lens, a cover glass may be disposed, or a coating layer may be formed on an upper portion of the exposure lens. Alternatively, in order to inhibit damage to the surface of the exposure lens, the exposure lens may be implemented using a wear-resistant material having higher rigidity than other lenses in the lens unit.

Further, an outer diameter of each of the lenses L1 and L2 included in the first lens unit 110 may increase toward a lower portion (e.g., in a −z-axis direction), but the embodiment is not limited thereto.

Light incident on the first lens unit 110 from the outside of the camera module 100 may pass through the liquid lens unit 140 and may be incident on the second lens unit 130. The second lens unit 130 may be implemented as a single lens and may be implemented as two or more lenses that are aligned along the central axis to form an optical system. For example, as illustrated in FIG. 3A, the second lens unit 130 may include three lenses L3, L4, and L5, but this is exemplary, and two or less lenses or four or more lenses may be included in the second lens unit 130.

Further, an outer diameter of each of the lenses L3, L4, and L5 included in the second lens unit 130 may increase toward a lower portion thereof (e.g., in the −z-axis direction), but the embodiment is not limited thereto.

In addition, unlike the liquid lens unit 140, each of the first lens unit 110 and the second lens unit 130 may be a solid lens and may be formed of glass or plastic, but the embodiment is not limited to a specific material of each of the first lens unit 110 and the second lens unit 130.

Further, the liquid lens unit 140 may include first to fifth regions A1, A2, A3, A4, and A5. Specifically, the fourth region A4 and the fifth region A5 are positioned on outermost sides of the camera module 100, and the first region A1, the second region A2, and the third region A3 may be disposed between the fourth region A4 and the fifth region A5. In addition, the third region A3 may be disposed between the first region A1 and the second region A2. In addition, the first region A1 may be disposed between the fourth region A4 and the third region A3, and the second region A2 may be disposed between the third region A3 and the fifth region A5.

In other words, the first region A1 and the second region A2 may be regions disposed in openings of side surfaces of the holder 120. The third region A3 may be a region between the first region A1 and the second region A2. In addition, the fourth region A4 and the fifth region A5 are regions that protrude from openings in the holder 120, and are regions disposed outside the holder 120 at the openings.

Hereinafter, the first adhesive member 162 and the second adhesive member 164 will be described, and the liquid lens unit 140 will be described below.

The first adhesive member 162 may include first and second adhesive portions 162-1 and 162-2, and the second adhesive member 164 may include third and fourth adhesive portions 164-1 and 164-2. The adhesive portion may include an adhesive, an epoxy, or the like.

First, the first adhesive portion 162-1 couples the holder 120 and an upper surface 140TS of the fourth region A4 of the liquid lens unit 140, and the third adhesive portion 164-1 couples the holder 120 and an upper surface of the fifth region A5 of the liquid lens unit 140. Here, the upper surface 140TS of each of the fourth region A4 and the fifth region A5 of the liquid lens unit 140 is exemplified as being an upper surface of a first connection substrate 141, but the embodiment is not limited thereto. For example, when the liquid lens unit 140 does not include connection substrates 141 and 144 or the spacer 143, the upper surface of the liquid lens unit 140 may be an upper surface of a liquid lens 142.

Further, the holder 120 may include a holder upper portion disposed above the liquid lens unit 140 (or the liquid lens 142) and a holder lower portion disposed below the liquid lens unit 140 (or the liquid lens 142). In addition, the holder 120 may also include a sidewall facing a side surface of the liquid lens 142 or the liquid lens unit 140. Each of the first adhesive portion 162-1 and the third adhesive portion 164-1 may couple the holder upper region 120U and the liquid lens unit 140. In this way, each of the first adhesive portion 162-1 and the third adhesive portion 164-1 couples the holder 120 and the liquid lens unit 140 so that the liquid lens unit 140 may be fixed to the holder 120.

Further, the second adhesive portion 162-2 may couple the holder 120 and a lower surface and a side surface of the fourth region A4 of the liquid lens unit 140. Here, the lower surface of the liquid lens unit 140 is exemplified as being a lower surface of a second connection substrate 144, and the side surface of the liquid lens unit 140 is exemplified as being a side surface of the spacer 143, but the embodiment is not limited thereto. For example, when the liquid lens unit 140 does not include the first and second connection substrates 141 and 144 or the spacer 143, the lower surface and the side surface of the liquid lens unit 140 may be the lower surface and the side surface of the liquid lens 142, respectively. Similarly, the fourth adhesive portion 164-2 may couple the holder 120 and a lower surface and a side surface of the fifth region A5 of the liquid lens unit 140. Here, the lower surface of the liquid lens unit 140 may be the lower surface of the second connection substrate 144, and the side surface of the liquid lens unit 140 may be the side surface of the spacer 143, but the embodiment is not limited thereto. For example, when the liquid lens unit 140 does not include the connection substrates 141 and 144 or the spacer 143, the lower surface and the side surface of the liquid lens unit 140 may be the lower surface and the side surface of the liquid lens 142, respectively.

In addition, each of the second adhesive portion 162-2 and the fourth adhesive portion 164-2 may couple the holder lower region 120D and the liquid lens unit 140. In this way, each of the second adhesive portion 162-2 and the fourth adhesive portion 164-2 may couple the holder 120 and the liquid lens unit 140 so that the opening of the holder 120 may be sealed. For example, the first adhesive portion 162-1 and the second adhesive portion 162-2 may be connected to each other, and the third adhesive portion 164-1 and the fourth adhesive portion 164-2 may be connected to each other, thereby performing the above-described sealing.

Although not shown in the drawings, the third adhesive member 166 may be disposed to fill a separation space (or gap) between the upper surface of the holder 120 and the first cover 170. In addition, the third adhesive member 166 may be omitted in some cases. In this case, the separation space between the upper surface of the holder 120 and the first cover 170 may be empty.

The embodiment is not limited to the shapes of the first to third adhesive members 162, 164, and 166 described above. That is, the first to third adhesive members 162, 164, and 166 may have various shapes as long as the adhesive members seal the inside of the holder 120 in order to inhibit an inflow of external foreign substances into the holder 120 through the opening of the holder 120. For example, when the third adhesive member 166 is disposed to fill the separation space between the upper surface of the holder 120 and the first cover 170 in a state in which the first adhesive member 162 and the second adhesive member 164 are disposed to seal the openings of the holder 120, the third region A3 of the liquid lens unit 140 disposed in an inner space of the holder 120 may be sealed from the outside. Accordingly, in the camera module 100 according to the embodiment, reliability against foreign substances can be improved, optical performance degradation can be inhibited, and a defect rate can be reduced.

In addition, each of the first to fourth adhesive portions 162-1, 164-1, 162-2, and 164-2 may have various shapes. That is, the first adhesive portion 162-1, the second adhesive portion 162-2, the third adhesive portion 164-1, and the fourth adhesive portion 164-2 may have shapes corresponding to the shapes of the openings of the holder 120.

In addition, an adhesive may be disposed in the first and second regions A1 and A2 as well as the fourth region A4 and the fifth region A5, but the present invention is not limited thereto.

Further, the above-described first cover 170 may be disposed to surround the holder 120, the liquid lens unit 140, the middle base 172, and a sensor base 178. Accordingly, the first cover 170 may be in contact with a shoulder-side upper surface 120S of the holder 120. In this case, when an upper surface 162S, 164S of each of the first adhesive portion 162-1 and the third adhesive portion 164-1 is positioned higher than the shoulder-side upper surface 120S of the holder 120, the first cover 170 may be in contact with the upper surface 162S, 164S of each of the first adhesive portion 162-1 and the third adhesive portion 164-1, instead of the shoulder-side upper surface 120S of the holder 120. Accordingly, the first cover 170 may be unstably fixed to the holder 120. In order to inhibit this, the upper surface 120S of the holder 120 may be disposed higher than the upper surface 162S of the first adhesive portion 162-1 by a predetermined height. Similarly, the upper surface 120S of the holder 120 may be positioned higher than the upper surface 164S of the third adhesive portion 164-1 by a predetermined height.

Further, the height of the upper surface 120S of the holder 120 may be equal to the height of the upper surface 162S of the first adhesive portion 162-1, and the height of the upper surface 120S of the holder 120 may be equal to the height of the upper surface 164S of the third adhesive portion 164-1.

In addition, in the above description, the liquid lens unit 140, which is given when describing the features of the first adhesive member 162 and the second adhesive member 164, includes the first and second connection substrates 141 and 144. However, the liquid lens unit 140, which is given when describing the features of the first adhesive member 162 and the second adhesive member 164 described above, may not include the first and second connection substrates 141 and 144.

Further, the first cover 170 may be disposed to surround the holder 120, the liquid lens unit 140, the third adhesive member 166, and the middle base 172 and may protect these (the holder 120, the liquid lens unit 140, the third adhesive member 166, and the middle base 172) from an external impact. In particular, as the first cover 170 is disposed, the plurality of lenses, which form an optical system, may be protected from an external impact.

Further, the first cover 170 may include an upper opening 170H formed in an upper surface of the first cover 170. Accordingly, the first lens unit 110 disposed in the holder 120 may be exposed to external light.

In addition, the middle base 172 may be disposed to surround a hole of the holder 120. Accordingly, the middle base 172 may include an accommodation hole 172H for accommodating the hole of the holder 120. An inner diameter of the middle base 172 (i.e., a diameter of the accommodation hole 172H) may be greater than or equal to an outer diameter of the hole of the holder 120. In addition, each of the accommodation hole 172H of the middle base 172 and the hole of the holder 120 is illustrated as having a circular shape, but the embodiment is not limited thereto, and these holes may be changed to various shapes. In addition, the middle base 172 may be mounted on the main substrate 150 to be spaced apart from a circuit element 151 on the main substrate 150.

Like the upper opening 170H of the first cover 170, the accommodation hole 172H may be formed at a position near a center of the middle base 172 at a position corresponding to the position of the image sensor 30 disposed on the camera module 100.

Further, the camera module 100 may further include the sensor base 178 and a filter 176 and may further include a circuit cover 154.

The filter 176 may filter light passing through the first lens unit 110, the liquid lens unit 140, and the second lens unit 130 in a specific wavelength range. The filter 176 may be an infrared (IR) light-blocking filter or an ultraviolet (UV) light-blocking filter, but the embodiment is not limited thereto.

Further, the filter 176 may be disposed above the image sensor 30. The filter 176 may be disposed inside the sensor base 178. For example, the filter 176 may be disposed or mounted in an inner recess or on a stepped portion of the sensor base 178.

The sensor base 178 may be disposed below the middle base 172 and attached to the main substrate 150. The sensor base 178 may surround the image sensor 30 and protect the image sensor 30 from external foreign substances or impacts.

Next, the main substrate 150 may be disposed below the middle base 172 and may include a recess in which the image sensor 30 may be mounted, seated, contacted, fixed, provisionally fixed, supported, coupled, or accommodated, the circuit element 151, a connection part (or a flexible printed circuit board (FPCB)) 152, and a connector 153.

Specifically, the main substrate 150 may include a holder region in which the holder 120 is disposed, and an element region in which a plurality of circuit elements 151 are disposed.

The main substrate 150 may be implemented as a rigid-flexible printed circuit board (RFPCB) including the FPCB 152. The FPCB 152 may be bent based on the requirement of a space in which the camera module 100 is mounted.

In addition, the circuit element 151 of the main substrate 150 may configure a control module configured to control the liquid lens unit 140 and the image sensor 30. Here, the control module will be described below.

In addition, the circuit element 151 may include at least one of a passive element and an active element and may have various widths and heights. The circuit element 151 may be provided as a plurality of circuit elements 151 and may protrude outward with a height greater than a height of the main substrate 150. The plurality of circuit elements 151 may be disposed not to overlap the holder 120 in a direction parallel to the optical axis LX. For example, the plurality of circuit elements 151 may include a power inductor, a gyro sensor, and the like, but the embodiment is not limited to a specific type of the circuit element 151.

The circuit cover 154 may be disposed to cover the circuit element 151. Accordingly, the circuit cover 154 may protect the circuit element 151 disposed on an upper portion of the main substrate 150 from an external impact. Further, to this end, the circuit cover 154 may include an accommodation space for accommodating and covering the circuit element 151 in consideration of the shape and position of the circuit element 151 disposed on the main substrate 150. In addition, the circuit cover 154 may have an electromagnetic shielding function.

The image sensor 30 may perform a function of converting light that has passed through the first lens unit 110, the liquid lens unit 140, and the second lens unit 130 of the lens assembly (110, 120, 130, 140, 162, and 164) into image data. More specifically, the image sensor 30 may generate image data by converting light into an analog signal through a pixel array including a plurality of pixels and synthesizing a digital signal corresponding to the analog signal.

Referring to FIGS. 3 and 4, the liquid lens unit 140 may include the first connection substrate (or individual electrode connection substrate) 141, the liquid lens (or liquid lens body) 142, the spacer 143, and the second connection substrate (or common electrode connection substrate) 144.

The first connection substrate 141 may electrically connect a plurality of first electrodes (not shown) included in the liquid lens 142 to the main substrate 150 and may be disposed above the liquid lens 142. The first connection substrate 141 may be implemented as an FPCB.

Further, the first connection substrate 141 may be electrically connected to an electrode pad 150-1, which is formed on the main substrate 150, through a connection pad 141-1 electrically connected to each of the plurality of first electrodes. To this end, after the liquid lens unit 140 is inserted into the inner space of the holder 120, the first connection substrate 141 may be bent in the −z-axis direction toward the main substrate 150, and then, the connection pad 141-1 and the electrode pad 150-1 may be electrically connected to each other through a conductive epoxy. In another embodiment, the first connection substrate 141 may be connected to a first holder surface electrode, which is conductive and is disposed, formed, or coated on a surface of the holder 120, to be electrically connected to the main substrate 150 through the first holder surface electrode, which is conductive and is disposed on the surface of the holder 120, but the embodiment is not limited thereto.

The second connection substrate 144 may electrically connect a second electrode (not shown) included in the liquid lens 142 to the main substrate 150 and may be disposed below the liquid lens 142. The second connection substrate 144 may be implemented as an FPCB or a single metal substrate (conductive metal plate).

Further, the second connection substrate 144 may be electrically connected to an electrode pad, which is formed on the main substrate 150, through a connection pad electrically connected to the second electrode. To this end, after the liquid lens unit 140 is inserted into the inner space of the holder 120, the second connection substrate 144 may be bent in the −z-axis direction toward the main substrate 150. In another embodiment, the second connection substrate 144 may be connected to a surface electrode, which is conductive and is disposed, formed, or coated on the surface of the holder 120, to be electrically connected to the main substrate 150 through the surface electrode, which is conductive and is disposed on the surface of the holder 120, but the embodiment is not limited thereto.

The liquid lens 142 may include a cavity CA. In addition, an opening area in a direction in which light enters the cavity CA may be smaller than an opening area in an opposite direction. Alternatively, the liquid lens 142 may be disposed such that a direction of inclination of the cavity CA is opposite to that illustrated in the drawing. In addition, the opening area in the direction in which light enters the cavity CA may be greater than the opening area in the opposite direction. In addition, when the liquid lens 142 is disposed such that the direction of inclination of the cavity CA is reversed, according to the direction of inclination of the liquid lens 142, a portion or the entirety of the arrangement of components included in the liquid lens 142 may be changed, or only the direction of inclination of the cavity CA may be changed and the remainder of the arrangement of the components may not be changed.

The spacer 143 may be disposed to surround the liquid lens 142 and may protect the liquid lens 142 from an external impact. To this end, the spacer 143 may have a shape in which the liquid lens 142 may be mounted in, seated in, in contact with, fixed to, provisionally fixed to, supported by, coupled to, or disposed in the spacer 143.

For example, the spacer 143 may include a hollow space 143H in which the liquid lens 142 is accommodated, and a frame configured to surround the hollow space 143H formed in a center thereof. In this way, the spacer 143 may have a centrally-hollowed quadrangular planar shape (hereinafter, referred to as a "z"-shaped form), but the embodiment is not limited thereto.

Further, the spacer 143 may be disposed between the first connection substrate 141 and the second connection substrate 144 and may be disposed to protrude from the opening of the holder 120.

Further, the liquid lens 142 may include a plurality of different types of liquids LQ1 and LQ2, first to third plates 147, 145, and 146, first and second electrodes E1 and E2, and an insulating layer 148. The liquid lens 142 may further include the optical layer 190.

In addition, the plurality of liquids LQ1 and LQ2 may be accommodated in the cavity CA, and may include a first liquid LQ1 having conductivity and a second liquid (or an insulating liquid) LQ2 having non-conductivity. Further, the first liquid LQ1 and the second liquid LQ2 may not be mixed with each other, and an interface BO may be formed at a contact portion between the first and second liquids LQ1 and LQ2. In addition, the second liquid LQ2 may be disposed on the first liquid LQ1, but the embodiment is not limited thereto.

Further, in a cross-sectional shape of the liquid lens 142, an edge of each of the first and second liquids LQ1 and LQ2 may be thinner than a central portion thereof. However, the present invention is not limited thereto.

An inner side surface of the first plate 147 may form a sidewall i of the cavity CA. The first plate 147 may include upper and lower openings having a predetermined inclined surface. That is, the cavity CA may be a region surrounded by the inclined surface of the first plate 147, the second plate 145, and the third plate 146.

Further, according to the embodiment, a size (or an area or a width) O2 of the lower opening may be larger than a size (or an area or a width) O1 of the upper opening. Here, the size of each of the upper and lower openings may be a sectional area in a horizontal direction (e.g., an x-axis direction and a y-axis direction). For example, the size of the opening may be a radius when the opening has a circular cross section and may be a diagonal length when the opening has a square cross section. In addition, a diameter of the opening may be changed depending on a field of view (FOV) required for the liquid lens 142 or the role of the liquid lens 142 to be performed in the camera module 100.

In addition, each opening may have the form of a hole having a circular cross section, and an inclined surface thereof may have an inclination. The interface BO may move along the inclined surface of the cavity CA by a driving voltage.

In addition, as described above, the first liquid LQ1 and the second liquid LQ2 may be filled, accommodated, or disposed in the cavity CA. In addition, the cavity CA is a portion through which the light that has passed through the first lens unit 110 is transmitted. Further, since the first plate 147 is positioned outside the cavity CA, the first plate 147 may be made of a transparent material. In addition, the first plate 147 may include impurities so that light is not easily transmitted therethrough.

In addition, the electrode may be disposed on each of one surface and the other surface of the first plate 147. A plurality of first electrodes E1 may be disposed to be spaced apart from the second electrode E2 and disposed on one surface (e.g., an upper surface, a side surface, or a lower surface) of the first plate 147. The second electrode E2 may be disposed on at least a partial region of the other surface (e.g., a lower surface) of the first plate 147 and may be in direct contact with the first liquid LQ1.

Further, the first electrodes E1 may include n electrodes (hereinafter, referred to as "individual electrodes"), and the second electrode E2 may include a single electrode (hereinafter, referred to as a "common electrode"). Here, n may be an integer greater than or equal to 2. Here, a case of four first electrodes E1 and one second electrode E2 will be described below. That is, both ends electrically connected to the liquid lens 142 may be any one of the plurality of first electrodes E1 and the second electrode E2.

Further, a portion of the second electrode E2 (i.e., an electrode sector of the second electrode E2) disposed on the other surface of the first plate 147 may be exposed to the first liquid LQ1 having conductivity.

Each of the first and second electrodes E1 and E2 may be made of a conductive material. For example, the first electrode E1 and the second electrode E2 may be made of a metal.

Further, the second plate 145 may be disposed on one surface of the first electrode E1. That is, the second plate 145 may be disposed above the first plate 147. Specifically, the second plate 145 may be disposed above an upper surface of the first electrode E1 and the cavity CA.

The third plate 146 may be disposed on one surface of the second electrode E2. That is, the third plate 146 may be disposed below the first plate 147. Specifically, the third plate 146 may be disposed below a lower surface of the second electrode E2 and the cavity CA.

The second plate 145 and the third plate 146 may be disposed opposite to each other with the first plate 147 interposed therebetween. In addition, at least one of the second plate 145 and the third plate 146 may be omitted.

At least one of the second and third plates 145 and 146 may have a quadrangular planar shape. The third plate 146 may be brought into contact with and bonded to the first plate 147 in a bonding region thereof around the edge.

The second plate 145 and the third plate 146 are regions through which light passes, and may be made of a transparent material. For example, each of the second and third plates 145 and 146 may be made of glass, and may be formed of the same material for convenience of the process. In addition, the edge of each of the second and third plates 145 and 146 may have a quadrangular shape, but the present invention is not necessarily limited thereto.

In addition, the second plate 145 may allow light incident from the first lens unit 110 to enter the cavity CA of the first plate 147.

Further, the third plate 146 may allow the light that has passed through the cavity CA of the first plate 147 to travel to the second lens unit 130. The third plate 146 may be in direct contact with the first liquid LQ1.

According to the embodiment, the third plate 146 may have a diameter larger than a diameter of a wider opening among the upper and lower openings of the first plate 147. In addition, the third plate 146 may include a peripheral region spaced apart from the first plate 147.

For example, an actual effective lens region of the liquid lens 142 may be narrower than the diameter (e.g., O2) of the wider opening among the upper and lower openings of the first plate 147. That is, when a region in a small radius about a central portion of the liquid lens 142 is used as an actual path for transmitting light, a diameter O3 of a central region of the third plate 146 may be smaller than a diameter (e.g., O2) of a wider opening among third and fourth openings of the first plate 147.

The insulating layer 148 may be disposed to cover a portion of a lower surface of the second plate 145 in an upper region of the cavity CA. That is, the insulating layer 148 may be disposed between the second liquid LQ2 and the second plate 145.

Further, the insulating layer 148 may be disposed to cover a portion of the first electrodes E1 that forms a sidewall of the cavity CA. In addition, the insulating layer 148 may be disposed on a lower surface of the first plate 147 to cover a portion of the first electrode E1, the first plate 147, and the second electrode E2. Accordingly, the insulating layer 148 may block the first electrode E1 from coming into contact with the first liquid LQ1 and block the first electrode E1 from coming into contact with the second liquid LQ2.

The insulating layer 148 may cover one electrode (e.g., the first electrode E1) of the first and second electrodes E1 and E2 and may expose a portion of another electrode (e.g., the second electrode E2) so that electric energy is applied to the first liquid LQ1 having conductivity.

Meanwhile, the optical layer 190 may be disposed on one surface of at least one of the second plate 145 and the third plate 146. For example, the optical layer 190 may be disposed on at least one of upper and lower portions of the second plate 145, may be disposed on at least one of upper and lower portions of the third plate 146, or may be disposed on at least one of upper and lower portions of each of the second and third plates 145 and 146.

In addition, the liquid lens 142 and the optical layer 190 are illustrated separately from each other, but the optical layer 190 may be a component of the liquid lens 142. In addition, the optical layer 190 is illustrated as being a single layer, but this is only to indicate the presence of the optical layer 190. That is, the optical layer 190 may be a single layer or a multilayer.

In addition, the optical layer 190 may include at least one of an ultraviolet light-blocking layer, an anti-reflection layer, or an infrared light-blocking layer. The optical layer 190 may be disposed to overlap the image sensor 30 in a direction of the optical axis LX (i.e., a z-axis) or in a direction parallel to the optical-axis direction. In addition, the optical layer 190 may be disposed in the third region A3 of the liquid lens unit 140. In addition, the anti-reflection layer may serve to inhibit light from being reflected from the second plate 145 or the third plate 146, may reduce a decrease in light transmittance due to Fresnel loss in the liquid lens 142, and may inhibit a decrease in visibility of the liquid lens 142 at night. In particular, although not shown in the drawings, the anti-reflection layer may be disposed on an inclined surface and a lower surface of the insulating layer 148, and may inhibit a decrease in the quality of light transmitted to the image sensor 30 due to the reflection of light.

In addition, the infrared light-blocking (IR cut-off) layer may block light in an infrared region. The infrared light-blocking layer may remove hot spots from an image by inhibiting external infrared light from being incident on the liquid lens 142, and may inhibit a decrease in visibility at night by reducing the reflection of light from a surface of the liquid lens 142.

In addition, at least one of the ultraviolet light-blocking layer, the anti-reflection layer, and the infrared light-blocking layer may be disposed on at least one of a light-receiving portion and a light-emitting portion of the camera module 100 according to the embodiment.

In addition, according to the embodiment, the optical layer 190 may have a coated form or a film form. For example, the anti-reflection layer of the optical layer 190 may be formed by coating at a low temperature by a spray method or the like.

FIGS. 5A to 5E are views for describing a method of driving the liquid lens unit. In the following description, a voltage will be described as being applied between the first electrode and the second electrode.

Figure 5A:
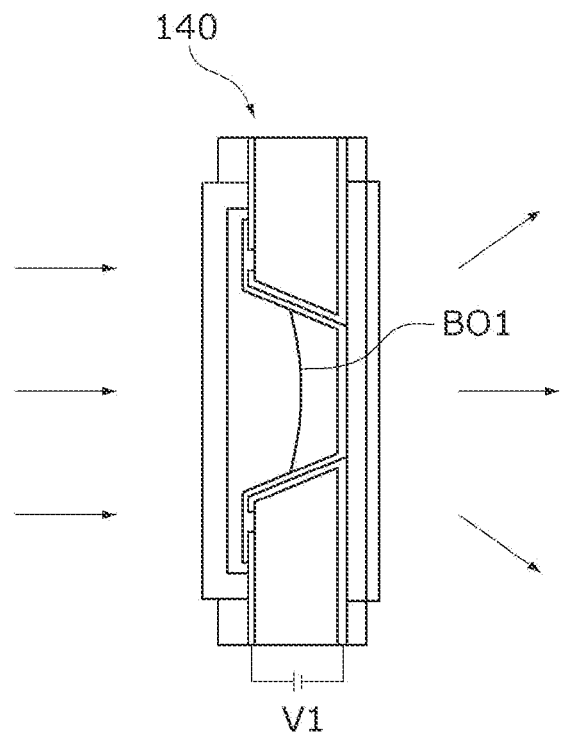
FIGS. 5A to 5E are views for describing a method of driving the liquid lens unit.
Figure 5B:
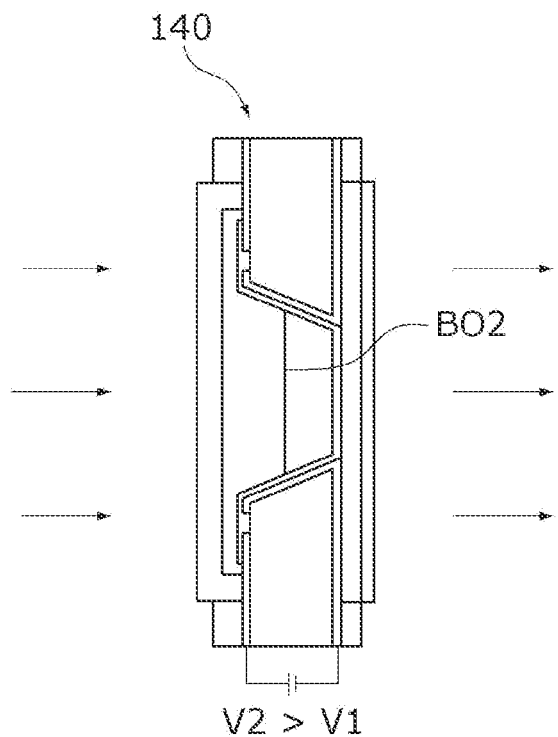

First, in FIG. 5A, a first voltage V1 is applied to the liquid lens unit 140 so that an interface BO1 of the liquid lens may be convex in a light traveling direction. Thus, it is illustrated that the liquid lens unit operates as a concave lens. In addition, in FIG. 5B, a second voltage V2 greater than the first voltage V1 is applied to the liquid lens unit 140 so that an interface BO2 of the liquid lens may be perpendicular to the light traveling direction. Thus, it is illustrated that the liquid lens unit does not change the light traveling direction. In addition, in FIG. 5C, a third voltage V3 greater than the second voltage V2 is applied to the liquid lens unit 140 so that an interface BO3 of the liquid lens may be convex in a direction opposite to the light traveling direction. Thus, it is illustrated that the liquid lens unit operates as a convex lens. In this case, when the first to third voltages V1 to V3 are applied, the interfaces BO1, BO2, and BO3 of the liquid lens in the liquid lens unit 140 may have different curvatures.

That is, in the liquid lens unit 140 according to the embodiment, it is illustrated that the curvature or diopter of the liquid lens of the liquid lens unit is changed depending on the level of the applied voltage, but the present invention is not limited thereto, and the curvature or diopter of the liquid lens may also be changed depending on a pulse width of an applied pulse.

Figure 5C:
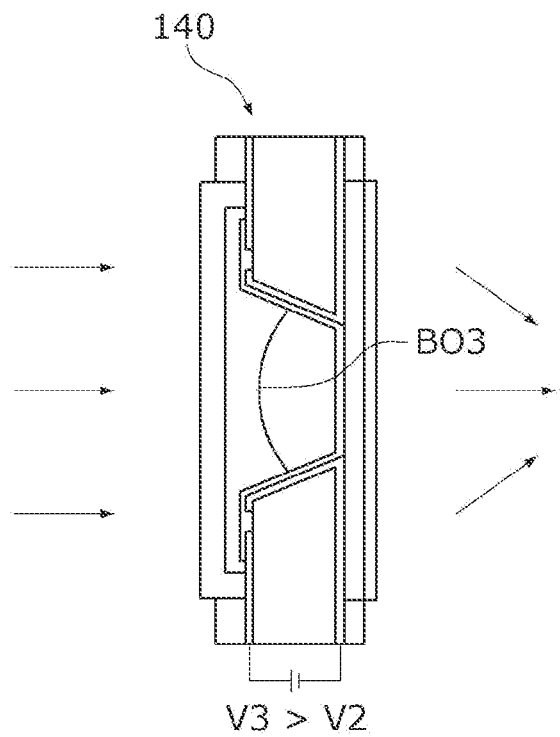
Figure 5D:
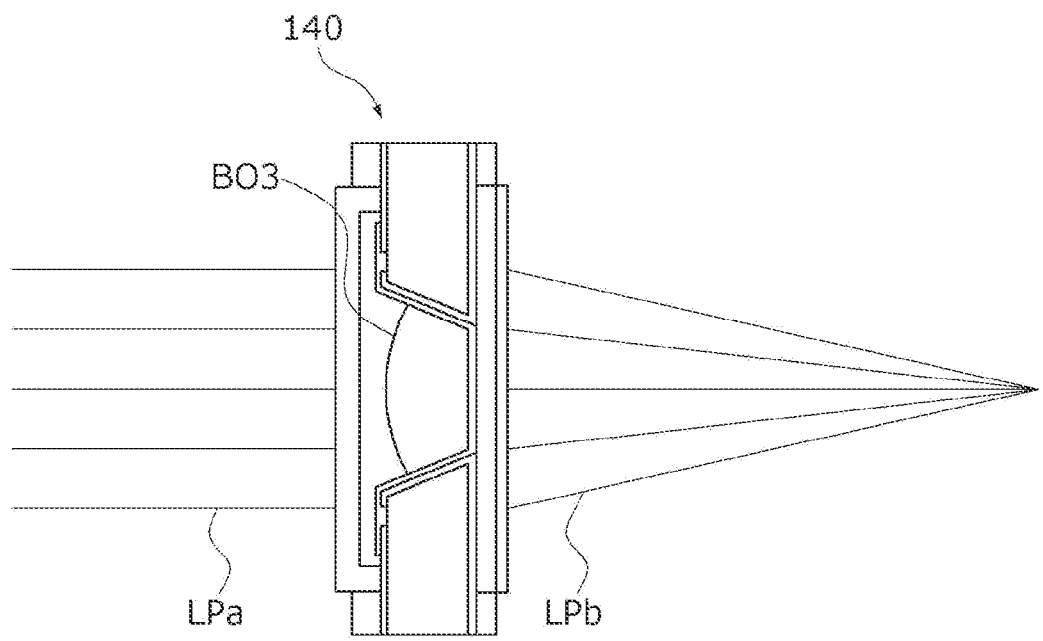

In addition, FIG. 5D illustrates that the liquid lens in the liquid lens unit 140 operates as a convex lens as the liquid lens in the liquid lens unit 140 has an interface the same as the interface BO3 as in FIG. 5C. Thus, according to FIG. 5D, incident light LPa is converged, and corresponding output light LPb is output.

Figure 5E:
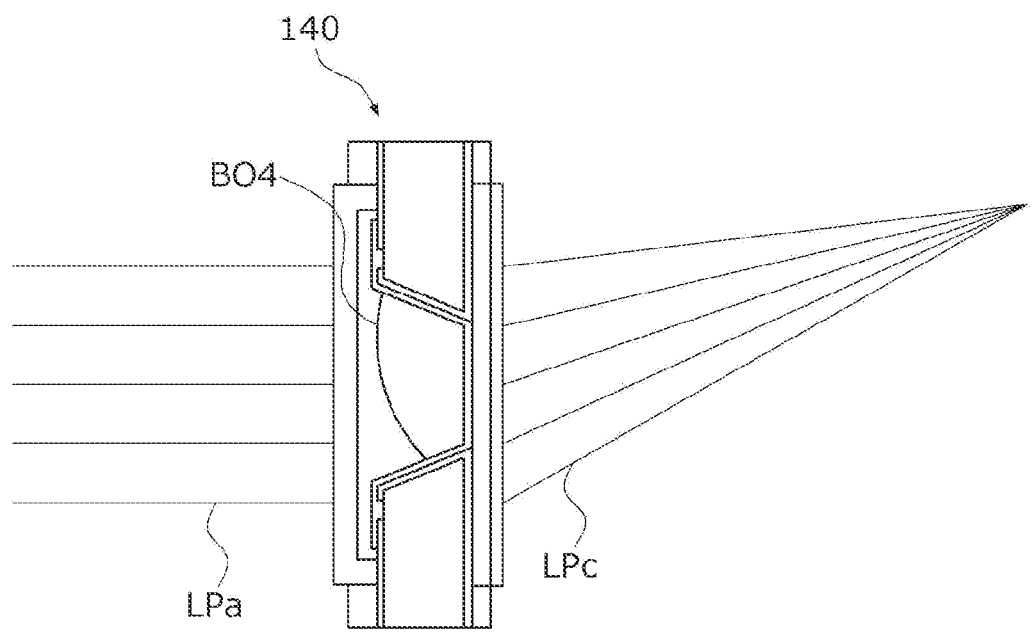

In addition, FIG. 5E illustrates that the liquid lens in the liquid lens unit 140 has an asymmetric curved surface (e.g., an upper portion of the interface is convex in a direction opposite to the light traveling direction), so that the light traveling direction is changed to one side (e.g., an upper side). That is, according to FIG. 5D, the incident light LPa is converged to the upper side, and corresponding output light LPc is output.

Figure 6:
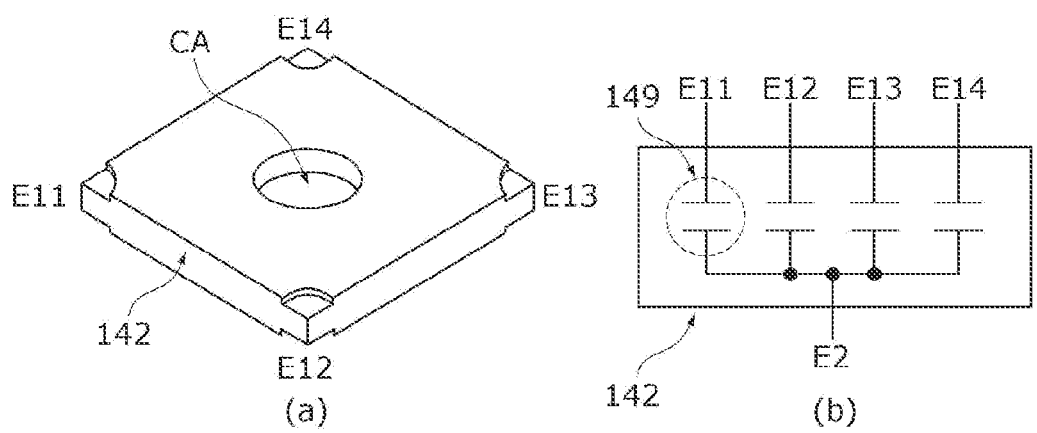
FIG. 6 is a view for describing the liquid lens unit in which an interface is adjusted according to a driving voltage.

FIG. 6 is a view for describing the liquid lens unit in which the interface is adjusted according to a driving voltage.

Referring to FIG. 6, FIG. 6A illustrates the liquid lens unit, and FIG. 6B illustrates an equivalent circuit of the liquid lens unit.

Referring to FIG. 6A, a lens 142 whose focal length is adjusted according to a driving voltage may receive the voltage through individual terminals L1, L2, L3, and L4 that are disposed in four different directions to have the same angular distance therebetween. The individual terminals may be disposed with the same angular distance therebetween with respect to a central axis of the liquid lens and may include four individual terminals. Each of the four individual terminals may be disposed at one of four corners of the liquid lens. When a voltage is applied through the individual terminals L1, L2, L3, and L4, an interface of the liquid lens may be deformed by a driving voltage, which is formed due to interaction between the applied voltage and a voltage applied to a common terminal C0, which will be described below.

Further, referring to FIG. 6B, the liquid lens 142 may have one side to which an operating voltage is applied from the different individual terminals L1, L2, L3, and L4 and another side electrically connected to the common terminal C0. In addition, the common terminal C0 may be connected to a plurality of capacitors 149. In addition, the plurality of capacitors 149 included in the equivalent circuit may have a small capacitance of about tens to about 200 pico-farads (pF) or less. The terminals of the liquid lens may be referred to as electrode sectors or sub-electrodes.

Figure 7C:
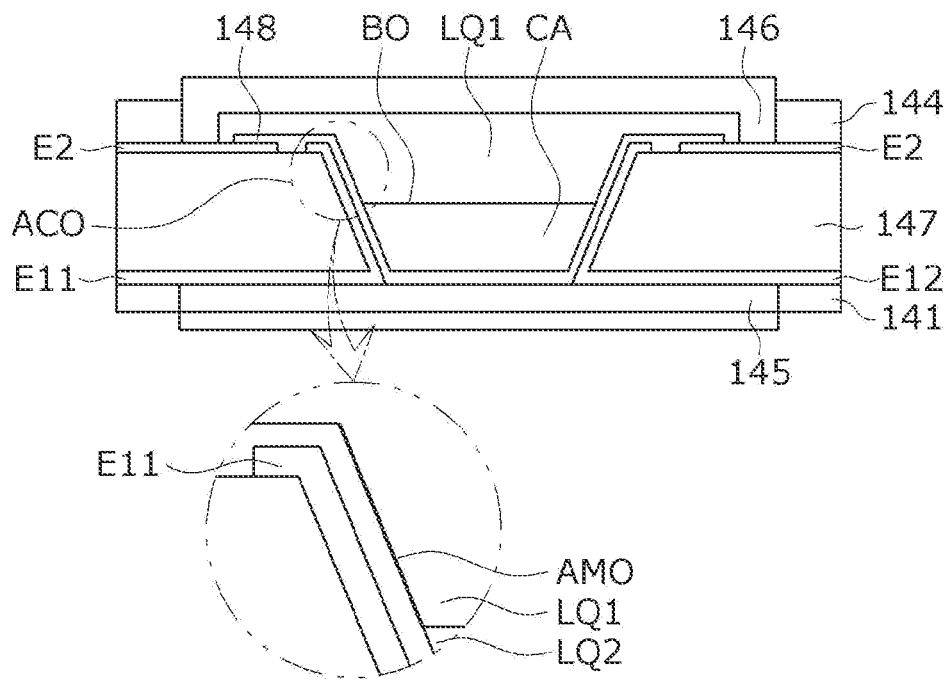

FIGS. 7A to 7C are views illustrating a structure of the liquid lens unit,

Referring to FIG. 7A, the liquid lens unit 140 may include a common electrode E2 (corresponds to the second electrode, and hereinafter, the second electrode and the common terminal are used interchangeably) at one side thereof. In this case, the common electrode E2 may be disposed in the form of a tube, and a liquid LQ may be disposed in a lower region of the common electrode E2, in particular, in a region corresponding to a hollow.

Meanwhile, although not shown in the drawing, in order to insulate the common electrode E2, an insulating layer may be disposed between the common electrode E2 and the liquid.

In addition, as shown in FIG. 7B, a plurality of first electrodes E11 to E14 (the first electrodes correspond to the individual electrodes, and hereinafter, the first electrodes and the individual terminals are used interchangeably) may be disposed below the common electrode, in particular, below the liquid LQ. The plurality of first electrodes E11 to E14, in particular, may be disposed in a shape surrounding the liquid LQ.

In addition, a plurality of insulating layers 148a to 148d for insulation may be respectively disposed between the plurality of first electrodes E11 to E14 and the liquid LQ.

Referring to FIG. 7C, the liquid lens unit 140 may include the plurality of first electrodes E11, E12, E13, and E14 disposed on the first connection substrate 141, the plurality of insulating layers 148a to 148d for insulating the first electrodes E11, E12, E13, and E14, the second liquid LQ2 disposed on the first electrodes E11, E12, E13, and E14, the first liquid LQ1 disposed on the second liquid LQ2, the second electrode E2 disposed apart from the second liquid LQ2 and the first electrodes E11, E12, E13, and E14, and the second connection substrate 144 disposed on the second electrode E2. In other configurations, the above-described contents may be applied.

Further, the second electrode E2 may be formed in the form of a tube with a hollow. In addition, the second liquid LQ2 and the first liquid LQ1 may be disposed in a hollow region. The second liquid LQ2 may be disposed in a circular shape as shown in FIGS. 7A and 7B.

Meanwhile, the hollow region may have a size that increases in a direction from bottom to top, and accordingly, each of the first electrodes E11, E12, E13, and E14 may have a size that decreases in a direction from bottom to top.

In FIG. 7C, a first-first electrode E11 and a first-second electrode E12 among the first electrodes E11, E12, E13, and E14 are each illustrated as being formed to be inclined and having a size that decreases in a direction from bottom to top. Meanwhile, unlike FIGS. 7A to 7C, the first electrodes E11, E12, E13, and E14 may be positioned above the second electrode E2. In other words, the first electrodes E11, E12, E13, and E14 may be positioned below the second electrode E2, but the present invention is not limited thereto.

Further, the first electrodes E11, E12, E13, and E14 are not limited to the above-described number and may be formed in various numbers.

Further, when a pulse-type electrical signal is applied to the first-first electrode E11 and the first-second electrode E12 after the pulse-type electrical signal is applied to the second electrode E2 and a predetermined period of time elapses, a potential difference is generated between the second electrode E2, the first-first electrode E11, and the first-second electrode E12, and accordingly, a shape of the first liquid LQ1 having electrical conductivity may be changed, and a shape of the second liquid LQ2 inside the second liquid LQ2 may be changed according to the change in the shape of the first liquid LQ1.

Meanwhile, in the present invention, proposed is a method of simply and quickly detecting the curvature of the second liquid LQ2 that changes according to an electrical signal applied to each of the first electrodes E11, E12, E13, and E14 and the second electrode E2. To this end, a sensor unit of the present invention may detect a size of an area or a change in the area of a boundary region Ac0 between the first liquid LQ1 and the first insulator 148a on the first electrode E11 in the liquid lens unit 140.

In FIG. 7C, AM0 is exemplarily given as an area of the boundary region Ac0. In particular, it is illustrated that the area of the boundary region Ac0, which is in contact with the first liquid LQ1, of an inclined portion of a first insulating layer 148a on the first-first electrode E11 is AM0. In addition, it is illustrated that the second liquid LQ2 is not concave or convex and is parallel to the first connection substrate 141 and the like. The curvature at this point may be defined as 0, for example.

For the boundary region Ac0, which is in contact with the first liquid LQ1, of the inclined portion of the first insulating layer 148a on the first-first electrode E11, a capacitance C may be formed according to Equation 1.

$$C = \varepsilon \frac{A}{d} \qquad \text{Equation 1}$$

Here, ε denotes a dielectric constant of a dielectric 148a, A denotes the area of the boundary region Ac0, and d denotes a thickness of the first dielectric 148a. The capacitance C may be a capacitance of the capacitor 149 illustrated in FIG. 6. Accordingly, since the above-described sensor unit detects the capacitance of the capacitor 149, the sensor unit may include the capacitor 149.

In addition, when it is assumed here that F and d are fixed values, the area of the boundary region Ac0 may greatly affect the capacitance C. That is, as the area of the boundary region Ac0 increases, the capacitance C formed in the boundary region Ac0 may increase. Meanwhile, since the area of the boundary region Ac0 is varied as the curvature of the second liquid LQ2 is varied, the area of the boundary region Ac0 or the capacitance C formed in the boundary region Ac0 may be detected using the sensor unit.

Meanwhile, in the present specification, the capacitance in FIG. 7C may be defined as CAc0.

FIGS. 8A to 8E are views for describing a variation in the lens curvature of the liquid lens unit.

FIGS. 8A to 8E illustrate that a first curvature BOa is formed in the second liquid LQ2 according to the application of an electrical signal to each of the first electrodes E11, E12, E13, and E14 and the second electrode E2.

Figure 8A:
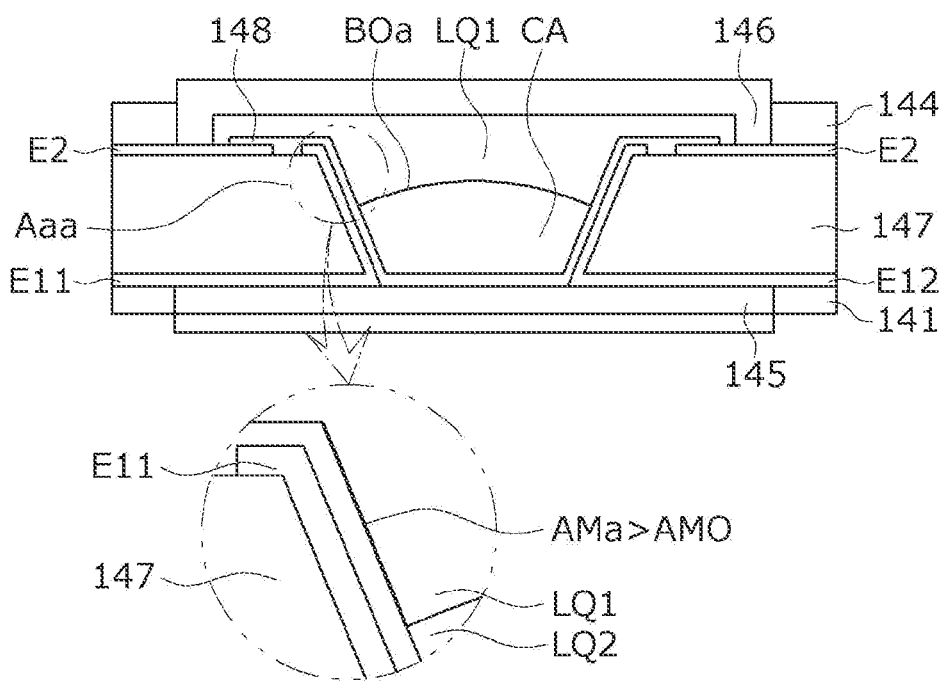
FIGS. 8A to 8E are views for describing a variation in a lens curvature of the liquid lens unit.

In FIG. 8A, it is illustrated that an area of a boundary region Aaa is AMa (>AM0) when the first curvature BOa is formed in the second liquid LQ2. In particular, it is illustrated that the area of the boundary region Aaa, which is in contact with an electroconductive aqueous solution LQ1, of the inclined portion of the first insulating layer 148a on the first-first electrode E11 is AMa.

According to Equation 1, the area of the boundary region Aaa in FIG. 8A is larger than that in FIG. 7C, and thus the capacitance of the boundary region Aaa becomes larger. Meanwhile, the capacitance in FIG. 8A may be defined as CAaa, which is greater than CAc0 that is the capacitance in FIG. 7C. In addition, the first curvature BOa at this point may be defined as having a value of positive polarity. For example, the first curvature BOa may be defined as having a level of +2.

Figure 8B:
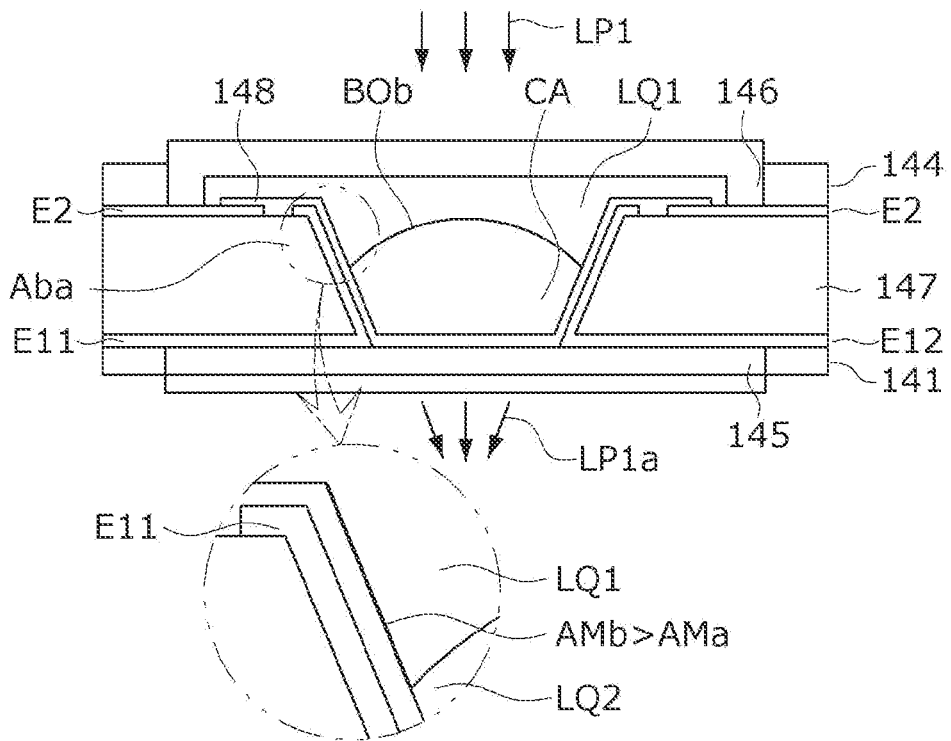

FIG. 8B illustrates that a second curvature Bob is formed in the second liquid LQ2 according to application of an electrical signal to each of the first electrodes E11, E12, E13, and E14 and the second electrode E2.

Referring to FIG. 8B, it is illustrated that an area of a boundary region Aba is AMb (>AMa) when the second curvature Bob is formed in the second liquid LQ2. In particular, it is illustrated that the area of the boundary region Aba, which is in contact with the first liquid LQ1, of the inclined portion of the first insulating layer 148a on the first-first electrode E11 is AMb.

According to Equation 1, the area of the boundary region Aba in FIG. 8B is larger than that in FIG. 8A, and thus the capacitance of the boundary region Aba becomes larger.

Meanwhile, the capacitance in FIG. 8B may be defined as CAba, which is greater than CAaa that is the capacitance in FIG. 8A.

The second curvature B0b at this point may be defined as having a value of positive polarity greater than the first curvature B0a. For example, the second curvature B0b may be defined as having a level of +4.

Meanwhile, according to FIGS. 8A and 8B, the liquid lens unit 140 operates as a convex lens, and accordingly, output light LP1a formed by converging incident light LP1 is output.

Figure 8C:
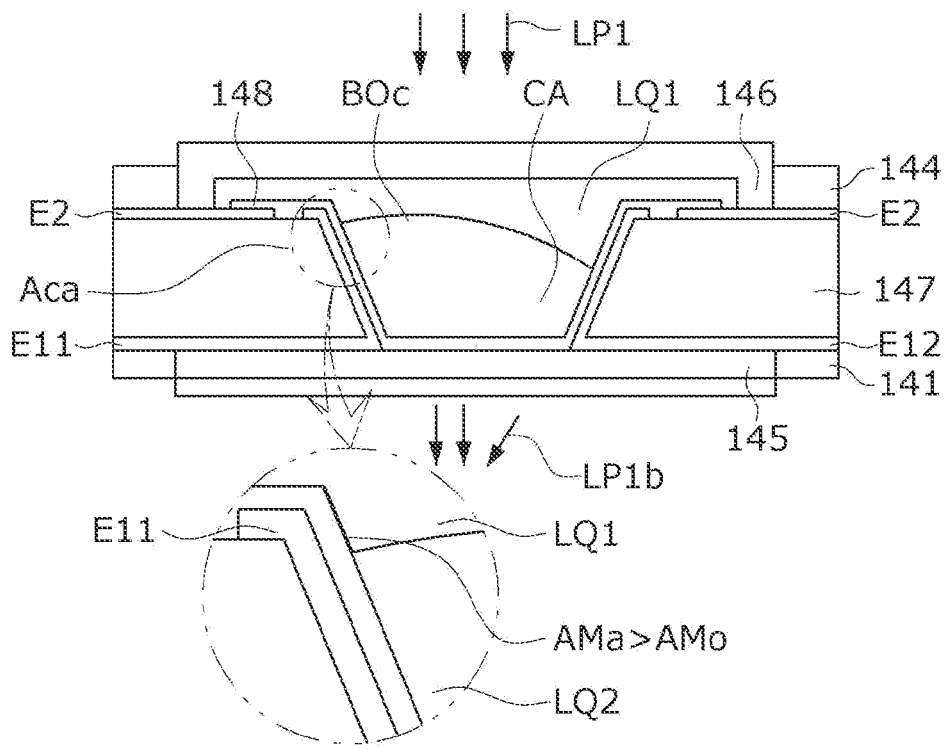

Next, FIG. 8C illustrates that a third curvature B0c is formed in the second liquid LQ2 according to application of an electrical signal to each of the first electrodes E11, E12, E13, and E14 and the second electrode E2.

In particular, in FIG. 8C, it is illustrated that an area of a left boundary region Aca is AMa and an area of a right boundary region Acb is AMa (>AMa).

In particular, it is illustrated that the area of the boundary region Aca, which is in contact with the first liquid LQ1, of the inclined portion of the first insulating layer 148a on the first-first electrode E11 is AMa, and the area of the boundary region Acb, which is in contact with the first liquid LQ1, of the inclined portion of the second insulator 148b on the second electrode E12 is AMb.

Accordingly, the capacitance of the left boundary region Aca may be CAaa, and the capacitance of the right boundary region Acb may be CAba. The third curvature B0c at this point may be defined as having a value of positive polarity. For example, the third curvature B0c may be defined as having a level of +3. Meanwhile, according to FIG. 8C, the liquid lens unit 140 operates as a convex lens, and accordingly, output light LP1b formed by converging incident light LP1 further to one side may be output.

Figure 8D:
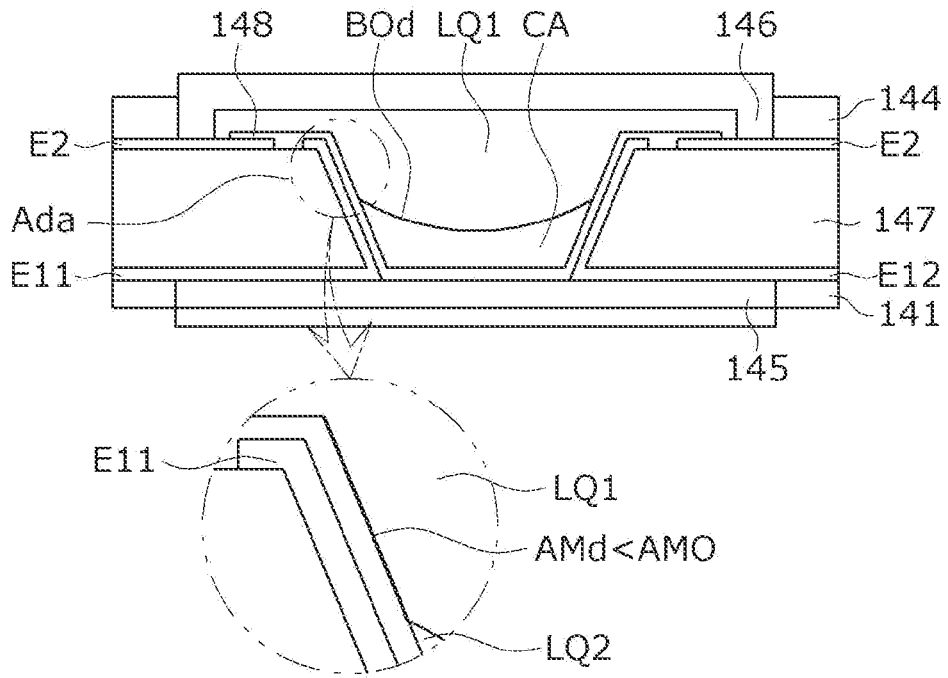

Next, FIG. 8D illustrates that a fourth curvature B0d is formed in the second liquid LQ2 according to application of an electrical signal to each of the first electrodes E11, E12, E13, and E14 and the second electrode E2.

In FIG. 8D, it is illustrated that an area of a boundary region Ada is AMd (<AM0) when the fourth curvature B0d is formed in the second liquid LQ2. In particular, it is illustrated that the area of the boundary region Ada, which is in contact with the first liquid LQ1, of the inclined portion of the first insulating layer 148a on the first-first electrode E11 is AMd.

According to Equation 1, the area of the boundary region Ada in FIG. 8D is smaller than that in FIG. 8C, and thus the capacitance of the boundary region Ada becomes smaller. Meanwhile, the capacitance in FIG. 8D may be defined as CAda, which is smaller than CAc0 that is the capacitance in FIG. 7C.

The fourth curvature B0d at this point may be defined as having a value of negative polarity. For example, the fourth curvature B0d may be defined as having a level of −2.

Figure 8E:
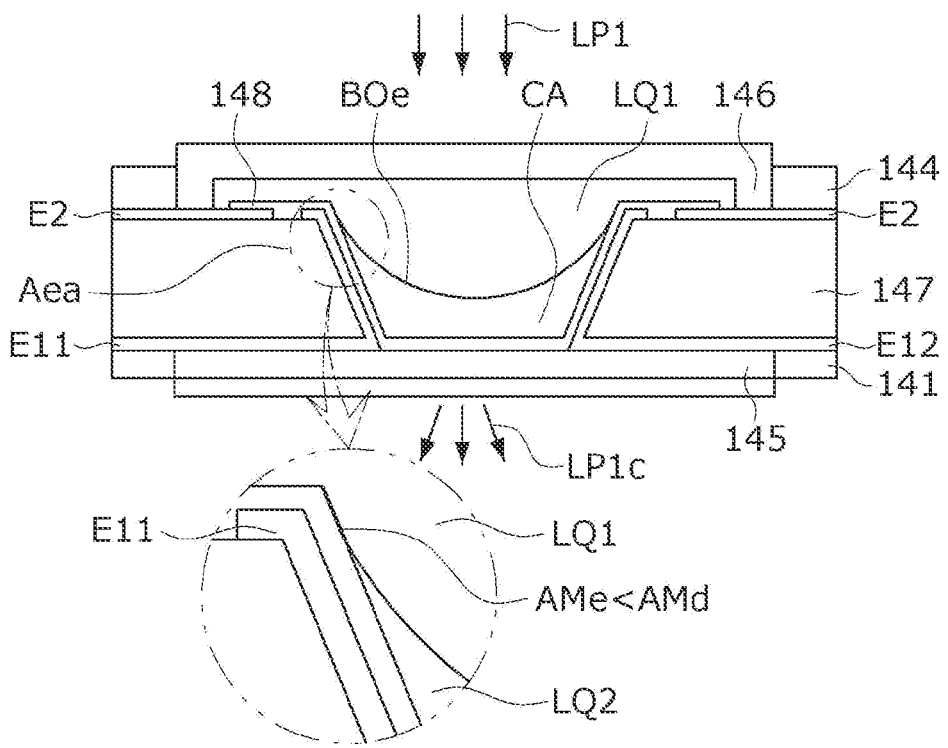

Next, FIG. 8E illustrates that a fifth curvature B0e is formed in the second liquid LQ2 according to application of an electrical signal to each of the first electrodes E11, E12, E13, and E14 and the second electrode E2.

In FIG. 8E, it is illustrated that an area of a boundary region Aea is AMe (<AMd) when the fifth curvature B0e is formed in the second liquid LQ2. In particular, it is illustrated that the area of the boundary region Aea, which is in contact with the first liquid LQ1, of the inclined portion of the first insulating layer 148a on the first-first electrode E11 is AMe.

According to Equation 1, the area of the boundary region Aea in FIG. 8E is smaller than that in FIG. 8D, and thus the capacitance of the boundary region Aea becomes smaller. Meanwhile, the capacitance in FIG. 8E may be defined as CAea, which is smaller than CAda that is the capacitance in FIG. 8D. The fifth curvature B0e at this point may be defined as having a value of negative polarity. For example, the fifth curvature B0e may be defined as having a level of −4.

Meanwhile, according to FIGS. 8D and 8E, the liquid lens unit 140 operates as a concave lens, and accordingly, output light LP1c formed by diverging incident light LP1 is output.

Figure 9:
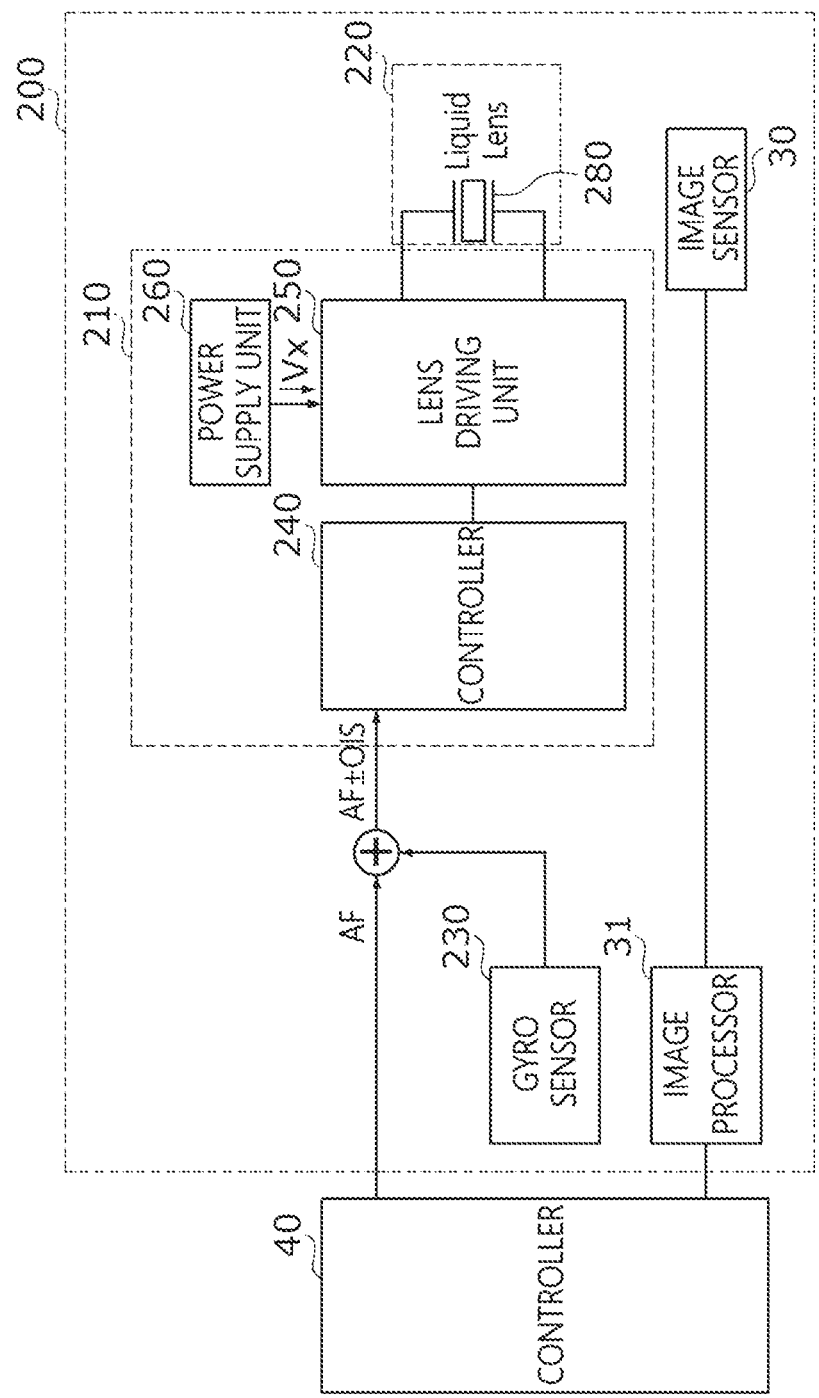
FIG. 9 is a block diagram of the camera module according to the embodiment.
Figure 10:
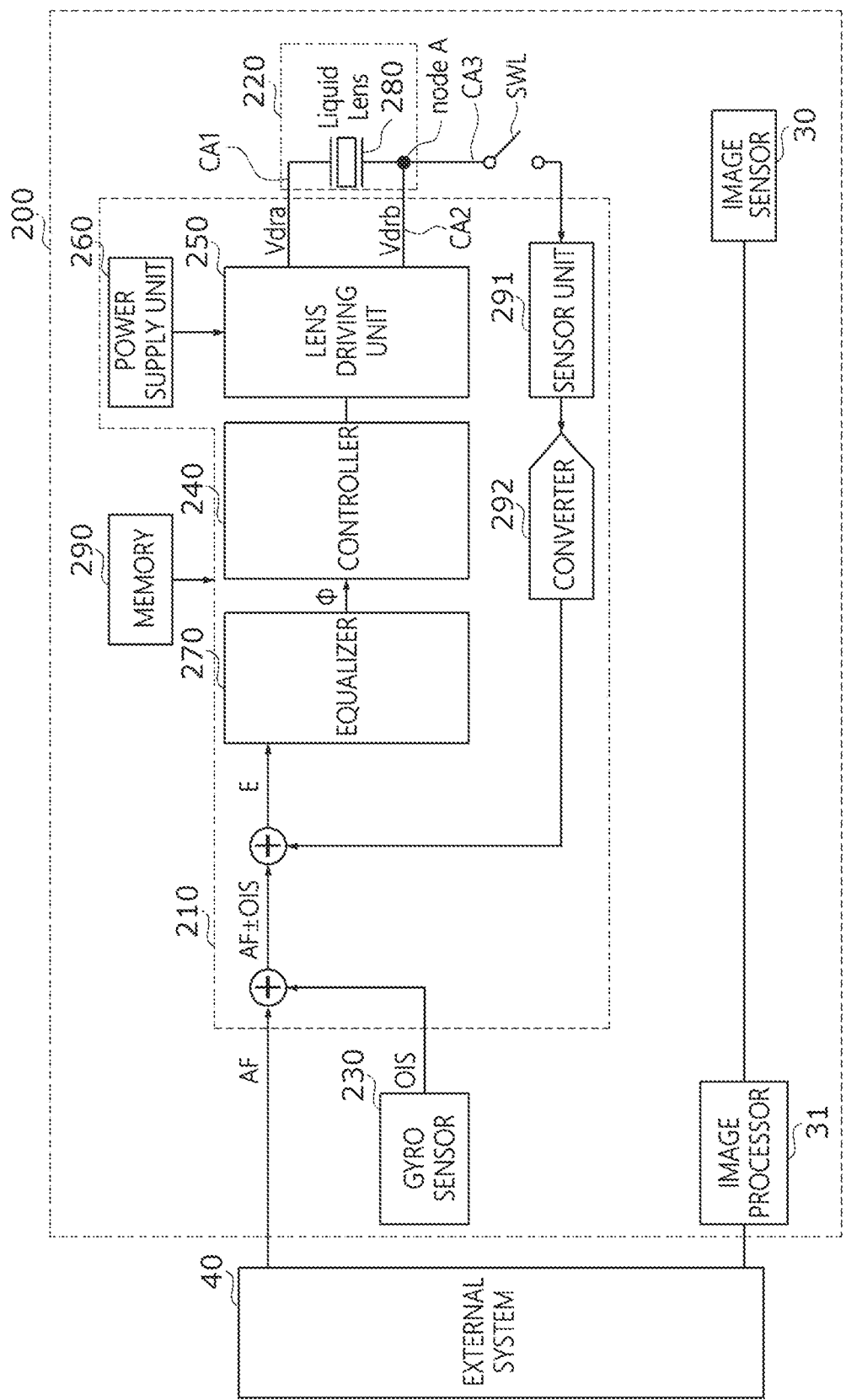
FIG. 10 illustrates a modified example of FIG. 9.

FIG. 9 is a block diagram of a camera module according to an embodiment, FIG. 10 illustrates a modified example of FIG. 9, and FIGS. 11 to 13 are views referenced in the description of FIGS. 9 and 10.

First, a term "unit" used herein includes a software, a field-programmable gate array (FPGA), or a hardware component such as an application-specific integrated circuit (ASIC), and the "unit" performs certain functions. However, the "unit" is not limited to the software or hardware. The "unit" may be configured to reside on an addressable storage medium or may be configured to play back one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Components and functions provided in "units" may be combined to be a smaller number of components and "units," or may be further divided into additional components and "units." Furthermore, the components and "units" may be implemented to play back one or more central processing units (CPUs) in a device or a secure multimedia card.

Referring to FIG. 9, a camera module 200 may include a control circuit 210, a lens assembly 220, and a gyro sensor 230. The control circuit 210 may correspond to the aforementioned control circuit 20, and the lens assembly 220 may correspond to the aforementioned lens assembly 10, i.e., the lens assembly (110, 120, 130, 140, 162, and 164). In addition, the camera module 200 may further include an image sensor 30 and an image processor 31.

First, the gyro sensor 230 may detect an angular velocity of a liquid lens 280 or the camera module, and may also be positioned in a controller 240. That is, the position of the gyro sensor is not limited to such a position. In addition, the gyro sensor 230 may detect an angular velocity (or an angle) of movement in two directions, for example, a yaw-axis direction and a pitch-axis direction, in order to compensate for hand tremor of the optical device in an up-down direction and a left-right direction. The gyro sensor 230 may generate a motion signal having information on the detected angular velocity and provide the motion signal to the voltage controller 240. Hereinafter, descriptions will be made using $X^+$, $X^-$, $Y^+$, and $Y^-$.

In addition, the image sensor 30 may convert light passing through the liquid lens 280 into an electrical signal. Further, the image processor 31 may perform image processing on the basis of the electrical signal from the image sensor 30. It should be understood that the image processor 31 may be positioned in the control circuit 210 or the camera module according to the embodiment or an external system (e.g., a terminal).

An external system 40 may be positioned outside the camera module. For example, the external system 40 may be a terminal and may provide the electrical signal to the camera module so that an interface of the liquid lens 280 in the camera module has a desired diopter. In an embodiment, the external system 40 may provide an electrical signal for setting a focus through the image processor 31 to the camera module (e.g., the control circuit 210). The external system 40 may transmit a signal, which is a digital code, to the controller 240. As described above, the external system 40 may be positioned outside the camera module. For example, the external system 40 may be positioned on the terminal and may further include a control unit, a controller, and the like. In addition, the external system 40 may be connected to the camera module by an inter-integrated circuit (I2C) communication method. However, the present invention is not limited thereto, and the connection may be made by other communication methods other than the I2C communication method.

The control circuit 210 may include the controller 240, a lens driving unit 250, and a power supply unit 260 and may control the operation of the lens assembly 220 including the liquid lens 280.

The controller 240 may have a configuration for performing an auto focus (AF) function and an optical image stabilization (OIS) function. The controller 240 may control the liquid lens 280 included in the lens assembly 220 using a user request or a detected result (e.g., a detection signal of the gyro sensor 230). Here, the liquid lens 280 may correspond to the liquid lens unit described above.

The controller 240 may calculate a driving voltage corresponding to a desired shape of the liquid lens 280. Specifically, the controller 240 may receive information (i.e., information on a distance to an object) for the AF function from an optical device, the internal component of the camera module 200 (e.g., the image sensor 30), or the external component (e.g., including a distance sensor or an application processor), and may calculate the driving voltage corresponding to the desired shape of the liquid lens 280 on the basis of a focal length, which is for focusing on the object, through the distance information.

In addition, the controller 240 may obtain a driving voltage code corresponding to the calculated driving voltage by referring to a driving voltage table and output the obtained driving voltage code to the lens assembly 220 (e.g., a driving voltage providing unit (not shown)). In this case, the controller 240 may have a driving voltage table in which the driving voltage code is mapped to generate the driving voltage. Alternatively, the controller 240 may further include a driving voltage unit (not shown) configured to generate the driving voltage, and the driving voltage unit may be positioned in a liquid lens module or in the camera module.

Alternatively, the controller 240 may generate an analog-type driving voltage corresponding to a provided digital-type driving voltage code on the basis of the digital-type driving voltage code and may provide the analog-type driving voltage to the lens assembly 220. Thus, the position of the driving voltage providing unit may be changed.

In an embodiment, the controller 240 may output a driving signal, which is a voltage code in a data form (e.g., digital), and may apply the driving signal in an analog form to the liquid lens 280 through pulse-width modulation (PWM) control. Accordingly, finally, the controller 240 may control the curvature of the liquid lens 280.

The lens driving unit 250 may selectively provide a voltage level supplied from the power supply unit 260, which will be described below, to each terminal of the liquid lens 280. In an embodiment, the lens driving unit 250 may include a switching unit. Here, the switching unit may include a circuit component called an H-bridge.

In addition, a high voltage output from a voltage booster may be applied as a power supply voltage of the switching unit. Accordingly, the switching unit may selectively supply the applied power supply voltage and a ground voltage to both ends of the liquid lens 280.

Further, as described above, the liquid lens 280 includes four first electrodes including four electrode sectors for driving, a first connection substrate, one second electrode, and a second connection substrate. Both ends of the liquid lens 280 may be any one of the plurality of first electrodes and the second electrode. In addition, both ends of the liquid lens 280 may be one of the four electrode sectors of the four first electrodes and one electrode sector of the second electrode.

Accordingly, a pulse-type voltage having a predetermined width may be applied to each electrode sector of the liquid lens 280. In addition, the voltage may be a difference between voltages applied to the first and second electrodes, and may be applied to the liquid lens 280.

The power supply unit 260 may apply a separate power to the lens driving unit 250. The power supply unit 260 may include the voltage booster that increases a voltage level. In addition, the aforementioned lens driving unit 250 may selectively output the increased voltage to each terminal of the liquid lens 280.

As described above, the controller 240 may control a phase of the driving signal supplied to the lens driving unit 250, that is, a phase of a pulse voltage applied to the common electrode and the individual electrode so that the lens driving unit 250 may generate an analog-type driving voltage corresponding thereto. In other words, the controller 240 may control a voltage applied to each of the first electrode and the second electrode. Hereinafter, a description will be made on the basis of a driving signal in the form of voltage.

In addition, the control circuit 210 may further include a connector (not shown) that performs a communication or interface function of the control circuit 210. For example, the connector may perform communication protocol conversion for communication between the control circuit 210, which uses an I2C communication method, and the lens assembly 220, which uses a mobile industry processor interface (MIPI) communication method. In addition, the connector may receive power from an external device (e.g., a battery) and supply power required for the operation of each of the controller 240 and the lens assembly 220. In this case, the connector may correspond to the connector 153 shown in FIG. 2.

Referring to FIG. 10, a camera module according to the modified example may include the components described in FIG. 9. That is, the same content may be applied to the components described in FIG. 9, and components other than those described in FIG. 9 will be described below.

First, the control circuit 210 may further include an equalizer 270, a sensor unit 291, a converter 292, and a memory 290. However, it should be understood that positions of the sensor unit 291 and the converter 292 are not limited to such positions and the sensor unit 291 and the converter 292 may be provided at any position in the camera module.

First, when a calculated curvature is greater than a target curvature, the equalizer 270 may control a duty of a pulse width to be increased or control a delay, which is a time difference between a plurality of pulses applied to the liquid lens 280, to be increased on the basis of a calculated curvature error (D. Accordingly, the camera module may quickly and accurately change the curvature of the liquid lens 280.

The equalizer 270 may receive focus information AF from the image processor 31 and shake information OIS from the gyro sensor 230, and determine the target curvature on the basis of the focus information AF and the inclination information (or shake information) OIS.

Here, an update cycle of the determined target curvature may be longer than an update cycle of the calculated curvature on the basis of the detected capacitance of the liquid lens 280. However, the present invention is not limited thereto.

In addition, since the update cycle of the calculated curvature is shorter than the update cycle of the target curvature, the curvature of the liquid lens 280 may be varied to be quickly changed to a desired curvature.

The memory 290 may be positioned separately from the control circuit 210. In addition, as described above, in order to form the target curvature, the control circuit 210 may output a changed voltage signal on the basis of the detected temperature, to the liquid lens 280 from the lens driving unit 250. In addition, the control circuit 210 may vary a delay, which is a time difference of a plurality of pulses applied to the liquid lens 280, according to the detected temperature.

Meanwhile, the memory 290 may store temperature information according to each diopter, delay information, information on a delay that is a time difference between a plurality of pulses (voltage signals) applied to the liquid lens 280, gain information, and offset information. For example, the memory 290 may store temperature information according to a first reference diopter (e.g., a 0 diopter), delay information, information on a delay that is a time difference between a plurality of pulses applied to the liquid lens 280, gain information, and offset information.

Further, the control circuit 210 may quickly and accurately vary the curvature of the lens using the detected temperature information by varying a delay, which is a time difference of a plurality of pulses applied to the liquid lens 280, according to the detected temperature.

That is, the control circuit 210 may vary the curvature of the lens quickly and accurately using the detected temperature information by varying a delay, which is a time difference of a plurality of pulses applied to the liquid lens 280, according to the information stored in the memory 290 and the detected temperature.

Further, the control circuit 210 may output a compensation signal for compensating for an offset of the signal sensed by the sensor unit 291 according to the detected temperature, thereby accurately detecting the curvature of the lens.

Further, the converter 292 may convert a signal related to the capacitance detected by the sensor unit 291 into a digital signal.

In addition, the camera module 200 may further include conductive lines CA1 and CA2 and a switching element SWL. First, the plurality of conductive lines CA1 and CA2 may supply an electrical signal from the lens driving unit 250 to each of the electrodes (the common electrode and the plurality of electrodes) in the liquid lens 280. In addition, the switching element SWL may be disposed between one (e.g., CA2) of the plurality of conductive lines and the sensor unit 291.

In the present specification, when referring to the drawings, by way of example, the conductive line CA2 may apply an electrical signal to any one of the plurality of electrodes in the liquid lens 280, and the switching element SWL may be disposed between the conductive line CA2 and the sensor unit 291. In this case, a contact point between the conductive line CA2 and one end of the switching element SWL or the liquid lens 280 may be referred to as node A.

Meanwhile, in the present invention, an electrical signal may be applied to each of the electrodes (the common electrode and the plurality of electrodes) in the liquid lens 280 through the plurality of conductive lines CA1 and CA2 to detect the curvature of the liquid lens 280. Accordingly, a curvature may be formed in the liquid in the liquid lens as described above.

For example, the switching element SWL may be turned on during a first period. At this point, when an electrical signal is applied to the electrodes in the liquid lens 280 in a state in which the switching element SWL is turned on and is thus electrically connected to the sensor unit 291, a curvature may be formed in the liquid lens 280. In addition, an electrical signal corresponding to the formed curvature may be supplied to the sensor unit 291 via the switching element SWL.

Accordingly, the sensor unit 291 may detect a size of an area or a change in the area of a boundary region in the liquid lens 280 of the liquid lens 280 on the basis of the electrical signal from the liquid lens 280 during the ON period of the switching element SWL. In an embodiment, the sensor unit 291 may detect a capacitance of the boundary region.

In addition, during a second period after the first period, the switching element SWL may be turned off, and the electrical signal may be continuously applied to the electrodes in the liquid lens 280. Accordingly, a curvature may be formed in the boundary region in the liquid lens.

In addition, during a third period after the second period, the switching element SWL may be turned off, and no electrical signal or a low-level electrical signal may be applied to the electrodes in the liquid lens 280.

In addition, during a fourth period after the third period, the switching element SWL may be turned on. At this point, the switching element SWL may be turned on and thus may be in a state of being electrically connected to the sensor unit 291. In addition, when an electrical signal is applied to the electrodes in the liquid lens 280, a curvature may be formed in the liquid lens 280, and an electrical signal corresponding to the formed curvature may be supplied to the sensor unit 291 via the switching element SWL.

Meanwhile, when the curvature calculated on the basis of the capacitance detected during the first period is less than the target curvature, the control circuit 210 may control a pulse width of the driving signal supplied to the lens driving unit 250 to be increased so that the curvature reaches the target curvature.

Thus, the time difference between the pulses applied to the plurality of individual electrodes E1 and the common electrode E2 may be increased, and accordingly, the curvature formed in the boundary region may be changed.

In addition, since the sensor unit 291 detects the curvature of the boundary region, the camera module may quickly and accurately identify the curvature of the liquid lens 280.

In addition, the lens driving unit 250, the sensor unit 291, the control circuit 210, the power supply unit 260, the converter 292, and the switching element SWL may be implemented by a single chip as a system on chip (SOC). However, the present invention is not limited thereto.

Referring to FIG. 11, a timing diagram for the common electrode E2, the individual electrode E1, and the switching element SWL in the camera module is illustrated.

Specifically, during a period Dt1 between a time point of T1 and a time point of T3, the switching element SWL is turned on. In this case, in order to detect the capacitance of the boundary region through the sensor unit 291, a curvature may be formed in the liquid lens 280 during the period Dt1 between the time point of T1 and the time point of T3.

In addition, it is illustrated that, for the accuracy and stability of detection in the sensor unit 291, in the present invention, a pulse is applied to one of the common electrode E2 and the plurality of individual electrodes E1 in the liquid lens 280 during the period Dt1 between the time point of T1 and the time point of T3.

In an embodiment, a pulse having a pulse width of Dt2 may be applied to the common electrode E2 at a time point of T2. Accordingly, a curvature may be formed in the liquid lens 280 after the time point of T2.

In addition, as described above, the sensor unit 291 may detect capacitances corresponding to the size of the area or the change in the area of the boundary region during a period between the time point of T2 and the time point of T3 in the period Dt1 between the time point of T1 and the time point of T3. Alternatively, during the period between the time point of T2 and the time point of T3, the sensor unit 291 may detect a potential difference or a current between the first liquid and the electrodes corresponding to the size of the area or the change in the area of the boundary region in the liquid lens 280.

In addition, a pulse having a pulse width of Dt3 may be applied to the individual electrode E1 at a time point of T4. That is, a high-level voltage may be applied to the common electrode E2 at the time point of T2, and a high-level voltage may be applied to the individual electrode E1 at the time point of T4.

Accordingly, the curvature in the liquid lens 280 may be varied due to a time difference DFF1 between the pulse applied to the common electrode E2 and the pulse applied to the individual electrode E1.

For example, as the time difference Dff1 between the pulses increases, the area of the boundary region may increase. In other words, the capacitance may be increased and the curvature may be increased.

In addition, it is possible to maintain or change the curvature in the liquid lens 280 by varying a time difference DFF2 between the pulses after the time difference DFF1 between the pulses.

In addition, it should be understood that, as will be described below in the camera module according to the embodiment, the controller may perform a control of varying a weight and performing compensation according to a weight ratio simultaneously with or separately from the compensation performed to obtain the above-described target curvature. For example, the function of the controller, which will be described below, may be achieved independent of the compensation, which is performed to obtain the target curvature, as in FIG. 9.

Figure 13C:
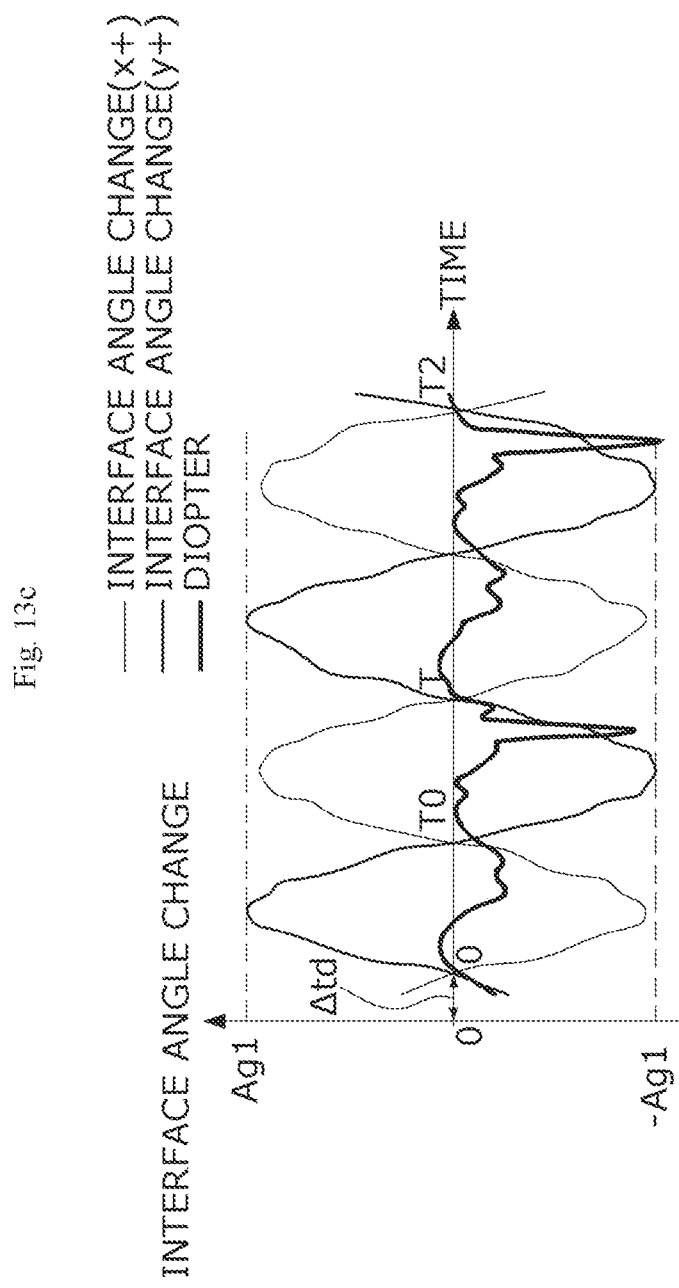
FIG. 13C is a view illustrating a change in an interface according to the application of driving signals having different weights.
Figure 14:
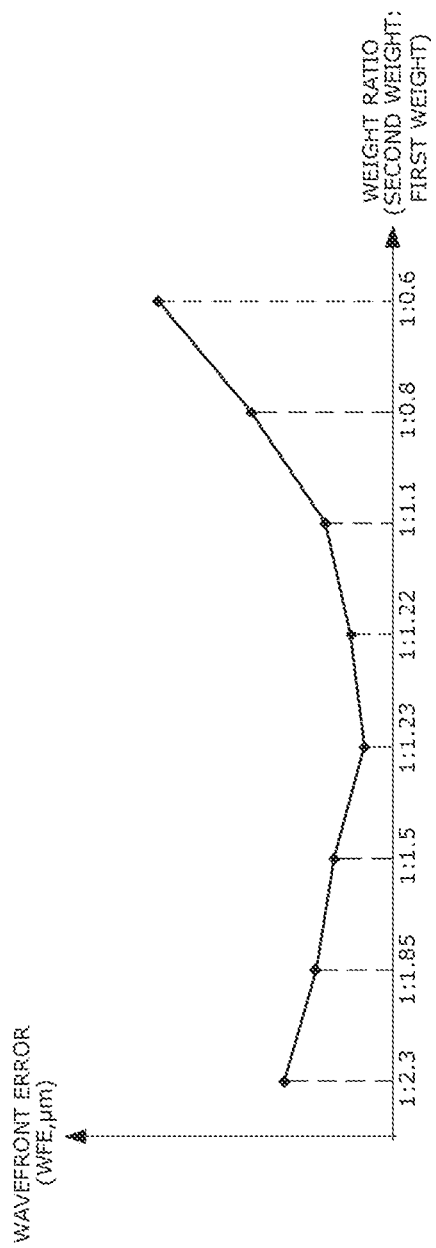
FIG. 14 is a view illustrating a wavefront error (WFE) according to weights.

FIGS. 12A and 12B are views for describing a driving of a camera module in response to shaking, FIGS. 13A and 13B are views for describing a case in which different driving signals are applied depending on weights, FIG. 13C is a view illustrating a change in an interface according to an application of driving signals having different weights, and FIG. 14 is a view illustrating a wavefront error (WFE) according to weights.

First, referring to FIGS. 12A and 12B, the liquid lens unit 140 may be shaken due to a shaking of a user's hand or the like. Accordingly, focusing on the image sensor may not be performed accurately through the liquid lens unit 140.

Further, the gyro sensor in the camera module may detect the shake information described above. In an embodiment, the gyro sensor may output inclination information. The inclination information may include an inclination (angle) of the camera module or liquid lens with respect to a reference position. For example, the gyro sensor may output information on an angular velocity, but may output information on an inclination through the angular velocity, which will now be described as inclination information.

Further, since the degree of the shaking of the user's hand is varied, the inclination (°) obtained through the gyro sensor is also varied, but the following description of the present specification is made on the premise that a change (from a to −a) in the inclination for a predetermined time (or a cycle T) is constant. In addition, it will be described that the driving signal also has a cycle T corresponding to the cycle T. In addition, it will be described that the gyro sensor detects the inclination of two axes and the two axes have a first axis (X) and a second axis (Y). In addition, the first axis (X-axis) and the second axis (Y-axis) may each correspond to any one of a yaw axis and a pitch axis, but the present invention is not limited thereto.

Referring to FIG. 13A, the liquid lens unit 140 may vary the interface BO of the liquid according to the shaking. That is, when the liquid lens unit 140 is inclined by as much as a first angle θ in response to the shaking of the camera module, the interface may be changed to compensate for the shaking. In this case, the first angle θ may be an angle with respect to a vertical axis OXL of an optical axis PXL before the shaking. In addition, before the shaking may mean a time point at which the focus information AF is received from an image processing unit, but the present invention is not limited thereto.

For example, in FIG. 13A, a right side of the interface BO may be convex to compensate for the shaking, and it will be described below based on an interface BOP before the interface is changed in response to the shaking. For convenience of description, the interface BOP before the interface is changed in response to the shaking will be described as a first interface, and the interface BO changed according to the shaking will be described as a second interface. In addition, as described above, the first interface BOP and the second interface BO are boundary regions between the first liquid LQ1 and the second liquid LQ2.

As it is deformed from the first interface BOP to the second interface BO, an interface angle may also be changed. The interface angle may be an angle formed between the interface and the first plate 147 or the insulating layer 148.

In an embodiment, the first interface BOP may form a first interface angle θ1 and a second interface angle θ2. In addition, the second interface BO may form a third interface angle θ1' and a fourth interface angle θ2'.

In addition, as it is deformed from the first interface BOP to the second interface BO, the first interface angle θ1 may be changed into the third interface angle θ3, and the second interface angle θ2 may be changed into the fourth interface angle θ4.

In addition, as described above, since the liquid lens unit 140 is inclined by as much as the first angle θ, when the optical axis PXL before shaking is used as a reference, an inclination in one region (hereinafter described as a first corresponding region S1 corresponding to the first-first electrode E11) and an inclination in another region (hereinafter described as a second corresponding region S2 corresponding to the first-second electrode E12) opposite to the one region may be complementary. For example, when an angular velocity in the first corresponding region S1 increases (when the angle is positive), an angular velocity in the second corresponding region S2 may decrease (the angle is negative). In other words, when the angular velocity of the liquid lens unit 140 increases, the inclination of the liquid lens in the corresponding region may become positive, and when the angular velocity thereof decreases, the inclination of the liquid lens in the corresponding region may become negative.

Here, the first corresponding region is a region in which the interface is changed corresponding to any one of the individual electrodes as shown in FIG. 7B. For example, when the individual electrodes are four as described above, first to fourth corresponding regions may be present.

That is, the gyro sensor may output inclination information in which the angular velocity increases in the first corresponding region S1 of the liquid lens and decreases in the second corresponding region S2 due to the shaking. In addition, it may be changed from the first interface BOP to the second interface BO due to the shaking. That is, the interface at the first corresponding region S1 may move upward (b), but the interface at the second corresponding region S2 may move downward (a).

Further, when the third interface angle θ3 is an angle decreased from the first interface angle θ1, the fourth interface angle θ4 may be an angle increased from the second interface angle θ2. In contrast, when the third interface angle θ3 is an angle increased from the first interface angle θ1, the fourth interface angle θ4 may be an angle decreased from the second interface angle θ2.

The controller according to the embodiment may apply different weights to the driving signal according to the increase or decrease of the angular velocity of the liquid lens which is obtained on the basis of the inclination information. Specifically, the controller may apply a first weight to the driving signal when the interface moves downward (or when the interface angle increases) due to the shake information in which the angle of the liquid lens decreases. In addition, the controller may apply a second weight to the driving signal when the interface moves upward (or when the interface angle increases) due to the shake information in which the angle of the liquid lens increases. In addition, the first weight may be less than the second weight.

In other words, when the angular velocity of the inclination information of the liquid lens decreases, the controller according to the embodiment may apply a weight that allows the driving signal to be increased. Alternatively, when the angular velocity of the inclination information of the liquid lens increases, the controller may apply a weight that allows the driving signal to be decreased.

Accordingly, the controller according to the embodiment may inhibit the interface from moving upward in the first corresponding region after moving downward in the second corresponding region. That is, the controller causes the interface to move with a similar reaction speed as the angular velocity increases or decreases. As a result, the camera module according to the embodiment may minimize a wavefront error (WFE) by controlling the movement (upward or downward movement) of the interface to equally occur. In addition, when the interface moves upward, the controller may rapidly perform OIS by reducing the reaction speed.

Further, the first weight and the second weight may be applied to the above-described time difference between the pulse applied to the common electrode E2 and the pulse applied to the individual electrode E1.

In an embodiment, the controller may vary the time difference between the pulses of the driving signal, which are applied to the liquid lens, according to the first weight and the second weight. That is, the first weight and the second weight may be applied to increase or decrease the above-described time difference between the pulse applied to the common electrode E2 and the pulse applied to the individual electrode E1.

In addition, a first delay corresponding to the first weight and a second delay corresponding to the second weight may be present in the time difference. In addition, when the same reference driving signal is applied, the first delay may be greater than the second delay. Accordingly, the wavefront error (WFE) may be minimized at the interface, and the reaction speed of the interface according to the driving signal may be improved. However, the present invention is not limited thereto, and it should be understood that the second interface BO may be raised or lowered in both the first corresponding region S1 and the second corresponding region S2.

For example, when the interface is raised in both the first corresponding region S1 and the second corresponding region S2, the interface angle decreases in both regions, and thus the second weight may be applied. In addition, when the interface is lowered in both the first corresponding region S1 and the second corresponding region S2, the interface angle increases in both regions, and thus the first weight may be applied.

Referring to FIG. 13B, it can be seen that different weights may be applied to the driving signal in response to the change (the increase or decrease of the angular velocity) in the angle shown in FIG. 12B.

Specifically, the controller may control the pulse width of the driving signal, which is a voltage code in a data form (e.g., digital) as described above, and provide an analog-type voltage illustrated in FIG. 13B to the individual electrodes of the liquid lens via the lens driving unit 250. Accordingly, the controller may accurately and rapidly control the curvature of the liquid lens in response to shaking, and may also minimize a wavefront error (WFE) according to the interface.

When there is no shaking, the controller may output a driving signal (hereinafter, referred to as a reference driving signal) corresponding to a signal to which AF is applied, that is, a signal received from an external system. In this case, the reference driving signal may have a magnitude of v1.

However, when there is shaking, the controller may output a driving signal that varies in response to the shaking. In other words, the controller according to the embodiment may change the reference driving signal in order to compensate for shaking, and depending on the increase or decrease of the angle, the controller may apply different weights for the change of the reference driving signal.

For example, when a first-fourth electrode E14 compensates for the first axis ($X^+$) in the liquid lens, the first-fourth electrode E14 may provide a driving signal having a voltage less than the magnitude v1 of the reference driving signal until TO at which the angular velocity increases. In this case, the driving signal may have a maximum value of v3.

Alternatively, when the first-second electrode E12 compensates for the second axis ($Y^+$) in the liquid lens, the first-second electrode E12 may provide a driving signal having a voltage greater than the magnitude v1 of the reference driving signal until TO at which the angular velocity decreases. In this case, the driving signal may have a maximum value of v2.

In this case, a voltage difference K1 between the minimum value v3 and the magnitude v1 of the reference driving signal may be greater than a voltage difference K2 between the maximum value v2 and the magnitude v1 of the reference driving signal. This may be a result due to the difference in the above-described weights. In addition, when there is no shaking, the minimum value and the maximum value may be the same as the reference driving signal.

Referring to FIG. 13C, a variation of the interface of the liquid lens according to the embodiment and the diopter are illustrated. In addition, after the inclination information is output from the gyro sensor and then a predetermined time Δtd has passed, the interface angle may be changed. It should be understood that this is due to a processing speed required for the controller to receive the inclination information, use the inclination information to apply weights to the driving signal, and then apply the driving signal to the liquid lens.

In addition, it can be seen that the wavefront error (WFE) is minimized since a change in the interface angle with respect to each of the X⁺ and Y⁺ (axes) is made without a time difference during a cycle T.

In addition, the diopter indicates a change in focus (or focusing) averaged in the individual electrodes E11 to E14. This will be described below.

Referring to FIG. 14, a wavefront error (WFE) according to a weight ratio (the second weight to the first weight) in the controller according to the embodiment is illustrated.

First, the wavefront error (WFE) was measured while changing the weight ratio from 1:0.6 to 1:2.3. In this case, it can be seen that when the weight ratio is in a range of 1:1.1 to 1:1.5, the wavefront error is less than that in the weight ratio of 1:1. That is, when the weight ratio is less than 1:1.1 or greater than 1:1.5, the wavefront error (WFE) increases, and thus, there is a limit that the resolution of the camera module is reduced. In addition, when the weight ratio is greater than 1:1.5, the interface moves upward in a region in which the angular velocity increases, and thus there is a limit that the reaction speed is further delayed.

Figure 15:
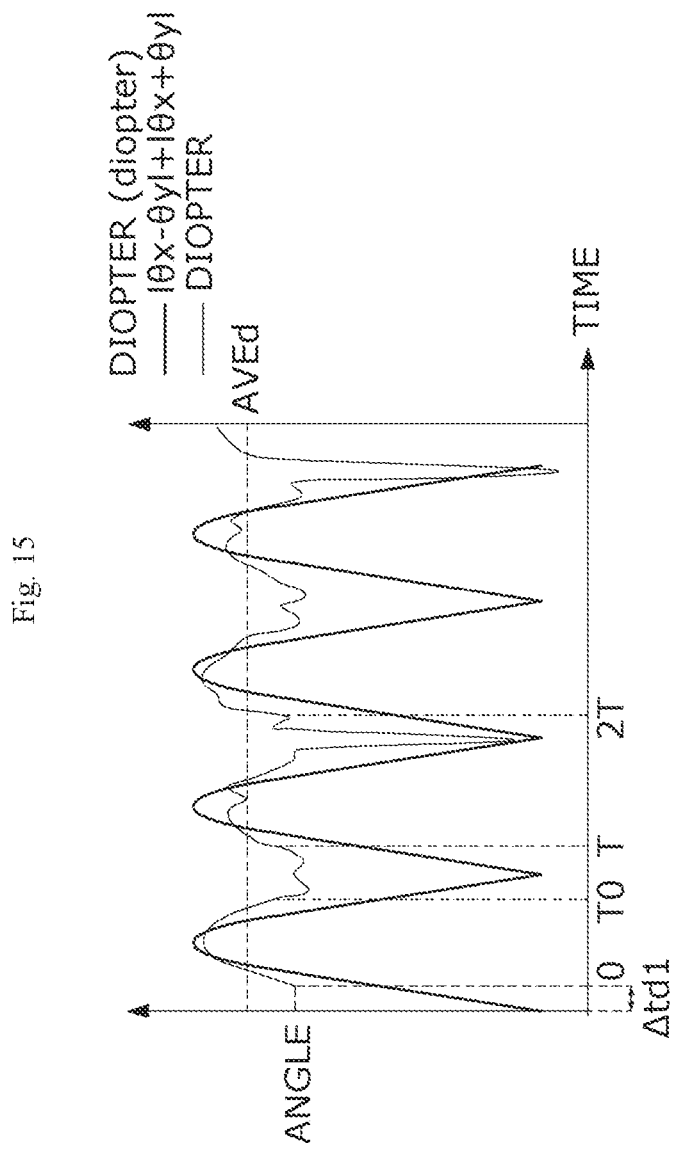
FIG. 15 is a view illustrating a change in diopter for a half cycle of the driving signal.
Figure 16:
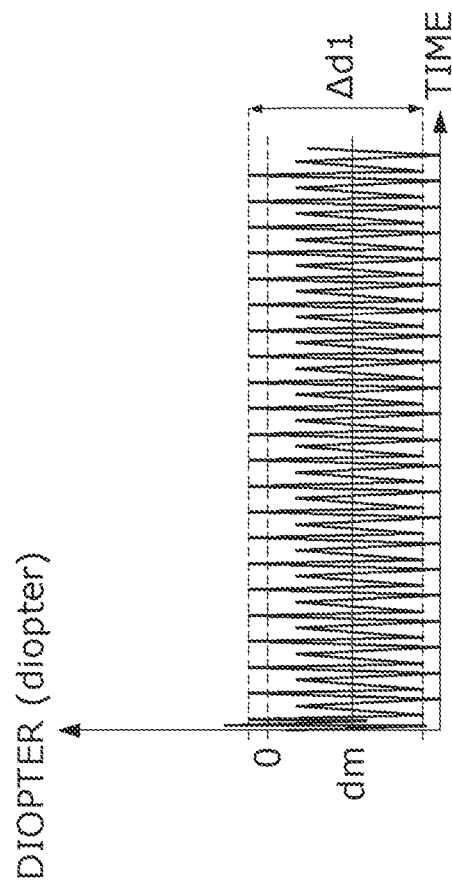
FIG. 16 is a view for describing diopter defocusing.
Figure 17:
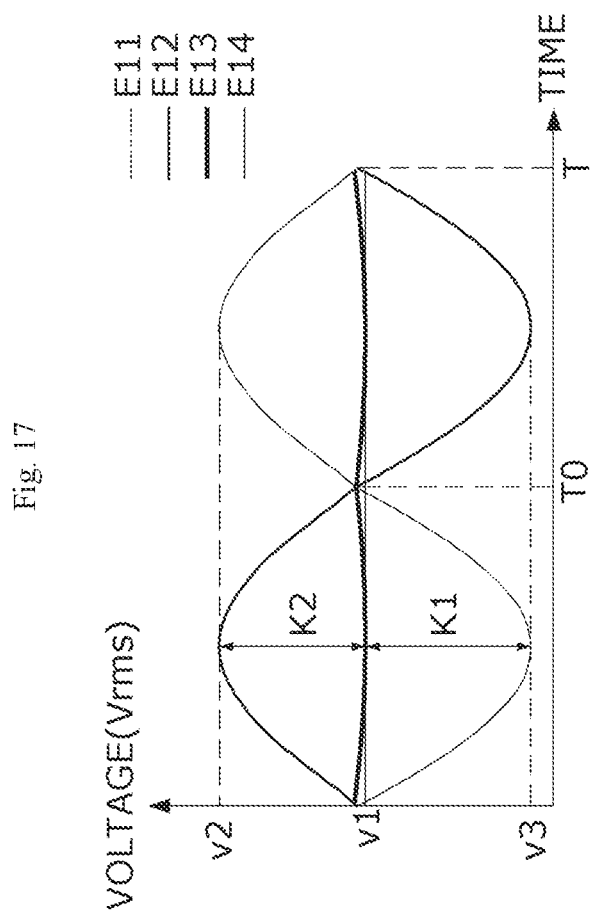
FIG. 17 is a view illustrating a variation of the driving signal during compensation.
Figure 18:
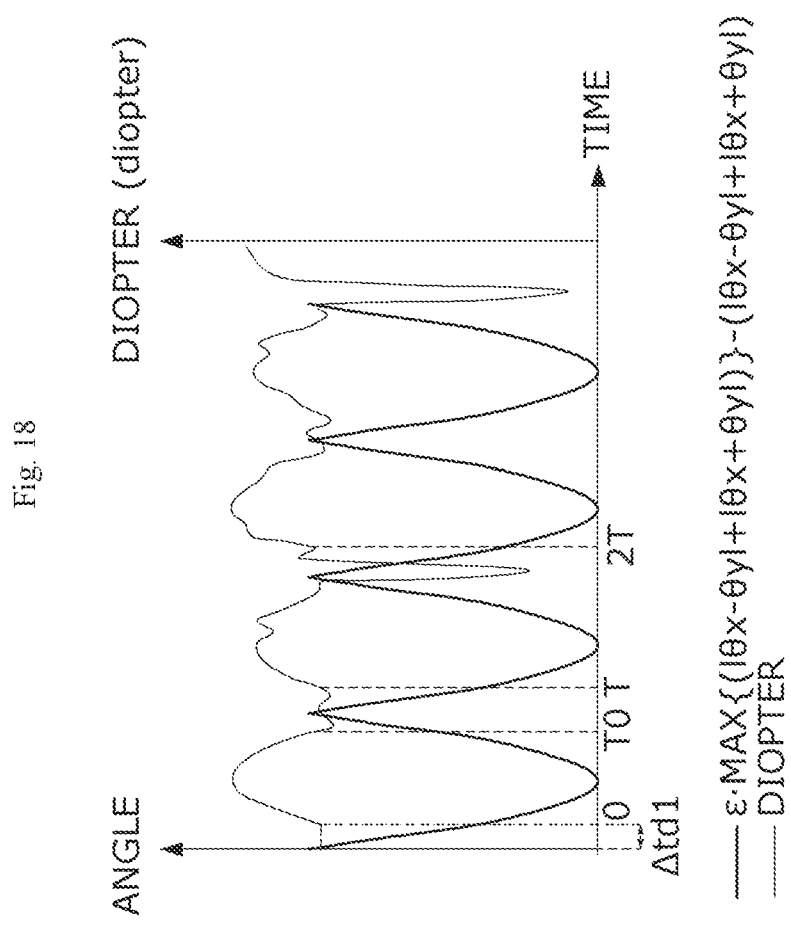
FIG. 18 is a view for describing compensation according to a weight difference.
Figure 19:
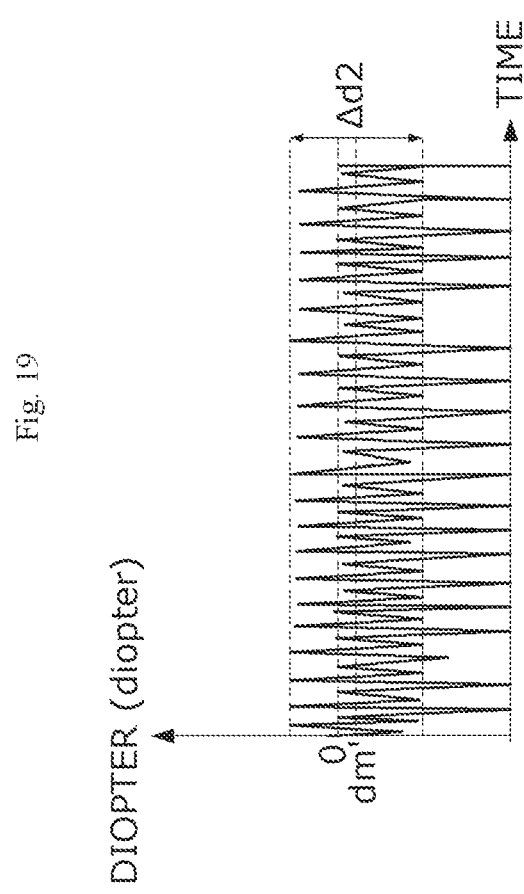
FIG. 19 is a view illustrating an average voltage value according to compensation.

FIG. 15 is a view illustrating a change in diopter for a half cycle of the driving signal, FIG. 16 is a view for describing diopter defocusing, FIG. 17 is a view illustrating a variation of the driving signal during compensation, FIG. 18 is a view for describing compensation according to a weight difference, and FIG. 19 is a view illustrating an average voltage value according to compensation.

First, the controller according to the embodiment may compensate for a difference between the first weight and the second weight in response to a half cycle of the driving signal.

Referring to FIG. 15, when a time difference Δtd1 due to signal processing is excluded, the diopter is increased or decreased based on an average diopter AVEd during the cycle T as described in FIG. 13C. Here, the average diopter AVEd is an average of voltages of the driving signal (or voltages applied to the individual electrodes) when AF is followed without performing OIS. Further, since the controller according to the embodiment has the first weight greater than the second weight, as described above, a decreasing rate of the voltage is greater than an increasing rate of the voltage. Accordingly, a change range of the diopter with respect to the average diopter AVEd may be increased.

Referring to FIG. 16, the controller according to the embodiment may increase a change range Δd1 of the diopter by varying the first weight and the second weight. In addition, the controller may provide a center diopter dm with a value smaller than that (zero (0) in the drawing) of the diopter through the AF only by varying the weight.

As a result, as the center diopter dm is smaller than 0 and the change range Δd1 increases due to the variation of the weight, the occurrence of defocusing may be increased.

Accordingly, the controller according to the embodiment may apply a driving signal according to Equation 1 below.

$$\begin{bmatrix} V_x^+ \\ V_x^- \\ V_y^+ \\ V_y^- \end{bmatrix} = V_0 \cdot \begin{bmatrix} 1 \\ 1 \\ 1 \\ 1 \end{bmatrix} + \begin{bmatrix} +G_{tilt}^*(g1 \text{ or } g2) & 0 & \varepsilon \\ -G_{tilt}^*(g1 \text{ or } g2) & 0 & \varepsilon \\ 0 & +G_{tilt}^*(g1 \text{ or } g2) & \varepsilon \\ 0 & -G_{tilt}^*(g1 \text{ or } g2) & \varepsilon \end{bmatrix} \quad \text{Equation 1}$$

$$\begin{bmatrix} \theta_x \\ \theta_y \\ \max_{\text{가 또는 7}}[|\theta_x - \theta_y| + |\theta_x + \theta_y|] - (|\theta_x - \theta_y| + |\theta_x + \theta_y|) \end{bmatrix}$$

where $V_X^+$, $V_X^-$, $V_Y^+$, and $V_Y^-$ are each a voltage of the driving signal applied to each individual electrode, $V_O$ is a voltage applied to the individual electrode to set a focus according to AF or a voltage before the compensation for shaking, Gtilt is a linear correlation coefficient between an optical inclination of the liquid lens and a voltage offset between opposite electrodes (e.g., X⁺ and X⁻ or Y⁺ and Y⁻), g1 is the second weight, g2 is the first weight, and F is a focus compensation parameter according to the first and second weights in the controller. In addition, $\theta_x$ is an x-axis angle, and $\theta_y$ is the y-axis angle.

Further, the x-axis angle and the y-axis angle are obtained by Equation 2 below.

$$\begin{pmatrix} \theta_x \\ \theta_y \end{pmatrix} = \theta_{opt} \cdot \begin{pmatrix} \cos(\Phi_0) \\ \sin(\Phi_0) \end{pmatrix} \quad \text{Equation 2}$$

where $\theta_{opt}$ is an optical inclination induced by a geometric inclination of the interface of the liquid lens, and is represented by Snell-Descartes' law of refraction. In addition, $\Phi_0$ is an azimuth angle and is an angle corresponding to a non-uniform voltage other than $V_O$, which affects the curvature of the interface, and may be changed according to a shape of the interface when the diopter due to AF is 0 (for example, the interface is parallel to the connecting substrate). In the present specification, since the interface is flat at 0 diopter, $<\Phi_0$ is 0°.

The controller according to the embodiment may compensate for the difference between the first weight and the second weight in response to a half cycle of the driving signal.

Specifically, according to the embodiment, due to a ratio between the second weight and the first weight, a decreasing rate of the driving signal may be further increased at every half cycle.

Referring to FIG. 15 again, it can be seen that the cycle T and amplitude of the diopter change to correspond to a change in $|\theta_x - \theta_y| + |\theta_x + \theta_y|$. That is, the change in diopter and the change in $|\theta_x - \theta_y| + |\theta_x + \theta_y|$ may be identically performed according to time.

However, as shown in FIG. 13A, since an angular velocity variation occurs every half cycle, the controller according to the embodiment may control the driving signal to compensate for the change in diopter at every half cycle for $|\theta_x - \theta_y| + |\theta_x + \theta_y|$.

More specifically, as in Equation 1 described above, the controller may compensate for the change range of the diopter and the center diopter, which are increased according to the weight ratio between the first weight and the second weight, through $\max_{half\ cycle}[|\theta_x-\theta_y|+|\theta_x+\theta_y|]-(|\theta_x-\theta_y|+|\theta_x+\theta_y|)$.

In an embodiment, since the first weight is greater than the second weight, the controller may apply $\max_{half\ cycle}[|\theta_x-\theta_y|+|\theta_x+\theta_y|]-(|\theta_x-\theta_y|+|\theta_x+\theta_y|)$ to each individual electrode to increase the magnitude of the driving signal (corresponding to the voltage) applied to the individual electrode. As a result, the controller may increase an average voltage difference of the driving signal for each cycle.

Referring to FIG. 17, it can be seen that different weights may be applied to the driving signal in response to the change (increase or decrease of the angular velocity) in the angle shown in FIG. 12B.

As described above, the controller may control the pulse width of the driving signal, which is a voltage code in a data form (e.g., digital) as described above, and provide an analog-type voltage illustrated in FIG. 13B to the individual electrodes of the liquid lens via the lens driving unit 250. Accordingly, the controller may accurately and rapidly control the curvature of the liquid lens in response to shaking, and may also minimize a wavefront error (WFE) according to the interface.

In addition, when there is no shaking, the controller may output a driving signal (hereinafter, referred to as a reference driving signal) corresponding to a signal to which AF is applied, that is, a signal received from an external system. In this case, the reference driving signal may have a magnitude of v1.

However, when there is shaking, the controller may output a driving signal that varies in response to the shaking. In other words, the controller according to the embodiment may change the reference driving signal in order to compensate for shaking, and depending on the increase or decrease of the angle, the controller may apply different weights for the change of the reference driving signal.

For example, when the first-fourth electrode E14 compensates for the first axis ($X^+$) in the liquid lens, the first-fourth electrode E14 may provide a driving signal having a voltage less than the magnitude v1 of the reference driving signal until TO at which the angular velocity increases. In this case, the driving signal may have a maximum value of v3.

Alternatively, when the first-second electrode E12 compensates for the second axis ($Y^+$) in the liquid lens, the first-second electrode E12 may provide a driving signal having a voltage greater than the magnitude v1 of the reference driving signal until TO at which the angular velocity decreases. In this case, the driving signal may have a maximum value of v2.

Further, likewise, a voltage difference K1 between the minimum value v3 and the magnitude v1 of the reference driving signal may be greater than a voltage difference K2 between the maximum value v2 and the magnitude v1 of the reference driving signal. This may be a result due to the difference in the above-described weights. In addition, when there is no shaking, the minimum value and the maximum value may be the same as the reference driving signal.

In addition, referring to FIG. 18, when a first-third electrode E13 compensates for a third axis ($X^-$) and the first-first electrode E11 compensates for a fourth axis ($Y^-$), the controller may apply a driving signal having a voltage greater than the magnitude v1 of the reference driving signal to the first-third electrode E13 and the first-first electrode E11 at every half cycle, which is a result of applying $\max_{half\ cycle}[|\theta_x-\theta_y|+|\theta_x+\theta_y|]-(|\theta_x-\theta_y|+|\theta_x+\theta_y|)$ to each of the individual electrodes E11 to E14 in response to Equation 1 described above (in addition, $\max_{half\ cycle}[|\theta_x-\theta_y|+|\theta_x+\theta_y|]-(|\theta_x-\theta_y|+|\theta_x+\theta_y|)$ is applied to the first-second electrode E12 and the first-fourth electrode E14 at every half cycle).

In addition, since $|\theta_x-\theta_y|+|\theta_x+\theta_y|$ and the size of the change in the diopter are different, the controller according to the embodiment may perform accurate compensation by controlling a focus compensation parameter F according to the first and second weights. That is, the magnitude of the driving signal of the individual electrode corresponding to the weight ratio may be compensated for by applying the focus compensation parameter ε to $\max_{half\ cycle}[|\theta_x-\theta_y|+|\theta_x+\theta_y|]-(|\theta_x-\theta_y|+|\theta_x+\theta_y|)$.

Since the controller according to the embodiment controls the weight ratio between the first weight and the second weight to be in a range of 1:1.1 to 1:1.5, the focus compensation parameter F according to the first and second weights may be 1 or less. In addition, the focus compensation parameter F may be in a range of 0.26 to 0.33. Accordingly, the controller according to the embodiment reduces the wavefront error (WFE) to improve the resolution and improve the reaction speed of the interface, and simultaneously, minimize defocusing. For example, by compensating for the difference between the first weight and the second weight at every half cycle through the controller, a focus change may be adjusted within a range that is not recognized by a person.

Referring to FIG. 19, as the controller varies the weight and compensates to correspond to the weight ratio (e.g., apply focus compensation parameters), a center diopter dm' may move closer to zero as compared to the center diopter dm (see FIG. 16) in the case in which the compensation is not performed. That is, the controller may increase the average voltage difference of the driving signal for each average cycle through the compensation. In addition, a variation range Δd2 of the diopter generated by the variation of the weight may be reduced to suppress the defocusing.

Another controller according to a modified example may apply different first and second weights for a predetermined time and equally reflect a third weight after the predetermined time. For example, the first weight and the second weight may be changed to one. Accordingly, the predetermined time may be greater than the cycle of the driving signal. Accordingly, the wavefront error (WFE) may be reduced to improve the resolution as described above, and the occurrence of defocusing may be suppressed through the third weight.

The invention claimed is:

1. A camera module comprising:
  a lens assembly including a liquid lens unit having a first liquid and a second liquid that form an interface;
  a gyro sensor configured to output inclination information; and
  a controller configured to adjust the interface by applying a driving signal to the liquid lens unit based on focus information and the inclination information,
  wherein the controller is configured to apply different weights to the driving signal according to an angular velocity of the liquid lens unit obtained based on the inclination information,
  wherein the controller is configured to apply a first weight to the driving signal when the angular velocity of the liquid lens unit increases, and apply a second weight to the driving signal when the angular velocity of the liquid lens unit decreases,
  wherein the first weight is greater than the second weight, wherein the controller is configured to compensate for a difference between the first weight and the second weight in response to a half cycle of the driving signal, and wherein the driving signal is a signal applied to each individual electrode coupled with the liquid lens unit that is configured to change a curvature of the interface.

2. The camera module of claim 1, wherein the controller is configured to vary a time difference between a plurality of pulses applied to the liquid lens unit according to the first weight and the second weight.

3. The camera module of claim 2, wherein the time difference includes a first delay corresponding to the first weight and a second delay corresponding to the second weight, and wherein the first delay is greater than the second delay.

4. The camera module of claim 1, wherein a ratio of the second weight and the first weight is in a range of 1:1.1 to 1:1.5.

5. The camera module of claim 1, wherein the controller is configured to increase an average voltage difference of the driving signal for each cycle during compensation.

6. The camera module of claim 5, wherein the controller is driven according to Equation 1 below, $$\begin{bmatrix} V_x^+ \\ V_x^- \\ V_y^+ \\ V_y^- \end{bmatrix} = V_0 \cdot \begin{bmatrix} 1 \\ 1 \\ 1 \\ 1 \end{bmatrix} + \begin{bmatrix} +G_{tilt}^*(g1 \text{ or } g2) & 0 & \varepsilon \\ -G_{tilt}^*(g1 \text{ or } g2) & 0 & \varepsilon \\ 0 & +G_{tilt}^*(g1 \text{ or } g2) & \varepsilon \\ 0 & -G_{tilt}^*(g1 \text{ or } g2) & \varepsilon \end{bmatrix} \cdot \begin{bmatrix} \theta_x \\ \theta_y \\ \max_{\text{日}\text{光}7}[|\theta_x - \theta_y| + |\theta_x + \theta_y|] - (|\theta_x - \theta_y| + |\theta_x + \theta_y|) \end{bmatrix}$$

Equation 1

(where $V_X^+$, $V_X^-$, $V_Y^+$, and $V_Y^-$ each is a voltage of the driving signal applied to each individual electrode, $V_O$ is a voltage applied to each individual electrode to set a focus according to auto-focusing (AF) or a voltage before a compensation for shaking, $G_{tilt}$ is a linear correlation coefficient between an optical inclination of the liquid lens unit and a voltage offset between opposite electrodes (including $X^+$ and $X^-$ or $Y^+$ and $Y^-$, g1 is the second weight, g2 is the first weight, and E is a focus compensation parameter according to the first and second weights provided by the controller; $\theta_x$ is an x-axis angle, and $\theta_y$ is a y-axis angle).

7. The camera module of claim 1, comprising a sensor unit configured to detect interface information corresponding to a curvature of the interface.

8. The camera module of claim 7, wherein the sensor unit detects a capacitance corresponding to a size of the interface or a change in an area of the interface.

9. The camera module of claim 1, comprising an image sensor configured to receive light passing through the lens assembly, wherein the focus information is based on image information output from the image sensor.

10. The camera module of claim 1, wherein the controller is configured to change the weights equally after a predetermined time.

11. The camera module of claim 1, wherein the liquid lens unit includes:

a plate including a cavity in which a conductive liquid and a non-conductive liquid are disposed while forming an interface;

a plurality of individual terminals disposed below the plate; and a common terminal disposed above the plate.

12. The camera module of claim 11, wherein the driving signal is applied to the plurality of individual terminals.

13. The camera module of claim 11, wherein the driving signal includes a signal applied to at least one of the plurality of individual terminals and the common terminal for a predetermined cycle.

* * * * *